United States Patent
Tsukamoto

(10) Patent No.: US 6,549,752 B2
(45) Date of Patent: Apr. 15, 2003

(54) APPARATUS AND METHOD ACCUMULATING CASES TO BE LEARNED

(75) Inventor: Koji Tsukamoto, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/960,298

(22) Filed: Sep. 24, 2001

(65) Prior Publication Data

US 2002/0102526 A1 Aug. 1, 2002

(30) Foreign Application Priority Data

Jan. 29, 2001 (JP) ........................................ 2001-019565

(51) Int. Cl.⁷ ................................................. G09B 7/00
(52) U.S. Cl. ...................................................... 434/362
(58) Field of Search ................................. 434/155, 156, 434/157, 335, 362; 706/8, 52

(56) References Cited

U.S. PATENT DOCUMENTS

| | | | | |
|---|---|---|---|---|
| 4,559,604 A | * | 12/1985 | Ichikawa et al. | 704/236 |
| 4,763,277 A | * | 8/1988 | Ashford et al. | 706/47 |
| 4,837,689 A | * | 6/1989 | Tanaka et al. | 704/8 |
| 4,999,786 A | * | 3/1991 | Mizutani et al. | 706/52 |
| 6,449,603 B1 | * | 9/2002 | Hunter | 706/15 |

FOREIGN PATENT DOCUMENTS

| | | |
|---|---|---|
| JP | A-5-54037 | 3/1993 |
| JP | A-5-233706 | 9/1993 |
| JP | A-5-324726 | 12/1993 |
| JP | A-6-131225 | 5/1994 |
| JP | A-6-348755 | 12/1994 |
| JP | A-7-36767 | 2/1995 |
| JP | A-7-36897 | 2/1995 |
| JP | A-7-49875 | 2/1995 |
| JP | A-7-78186 | 3/1995 |
| JP | A-7-114572 | 5/1995 |
| JP | A-7-192002 | 7/1995 |
| JP | A-8-153121 | 6/1996 |
| JP | A-9-22414 | 1/1997 |
| JP | A-9-153049 | 6/1997 |

OTHER PUBLICATIONS

Quinlan, "C4.5: Programs for Machine Learning", Morgan Kaufmann Publishers, Inc., 1993, pp. 72–73.
Rumelhart, et al., "Parallel Distributed Processing: Explorations in the Microstructure of Cognition", vol. 1: Foundations, MIT Press, 1986, p. 23.
Freund, et al., "Experiments with a New Boosting Algorithm", Machine Learning: Proceedings of the Thirteenth International Conference, 1996, pp. 1–9.

* cited by examiner

Primary Examiner—John Edmund Rovnak
(74) Attorney, Agent, or Firm—Staas & Halsey, LLP

(57) ABSTRACT

An inference rule for determining a category is generated from a set of correct answer cases registered to a database, and the category of an unknown case is inferred. When a user determines whether or not an inference result is correct and inputs a determination result, the determined unknown case is registered to the database as a new correct answer case. By repeating such a process, correct answer cases are accumulated.

12 Claims, 25 Drawing Sheets

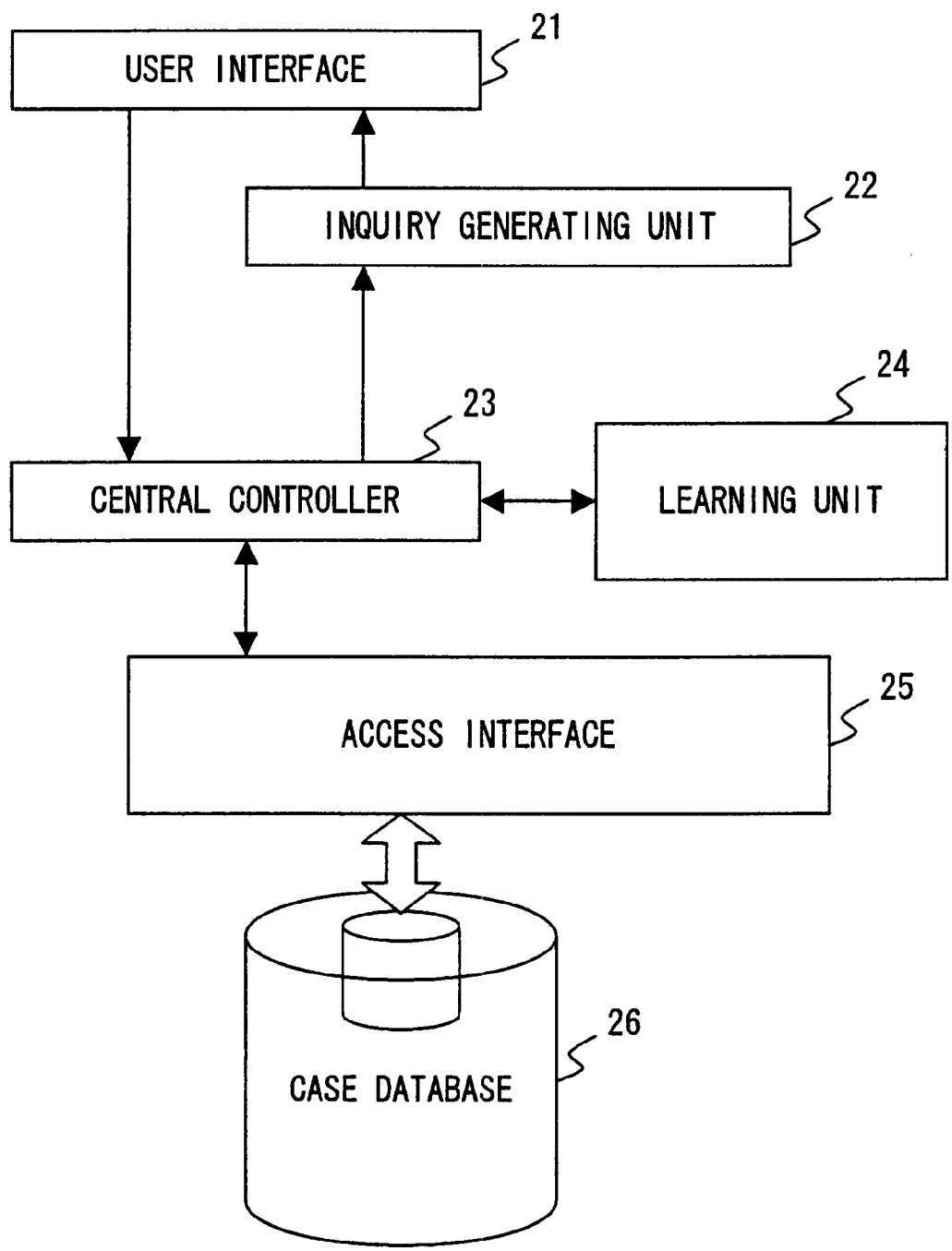
F I G. 2

| ID | FLAG | CATEGORY | CONTENTS |
|---|---|---|---|
| • | ○ | A | positive, 3, +, a,... |
| • | ○ | not A | positive, 2.8, -, a,... |
| 3 | ○ | not A | negative, 4, +, b,... |
| ⋮ | ⋮ | ⋮ | ⋮ |
| 5001 | × | ? | positive, 5, -, c,... |
| 5002 | × | ? | negative, 3.5, +, a,... |
| 5003 | × | ? | negative, 4, -, b,... |
| • | × | ? | positive, 4.2, -, b,... |
| ⋮ | ⋮ | ⋮ | ⋮ |

F I G. 4

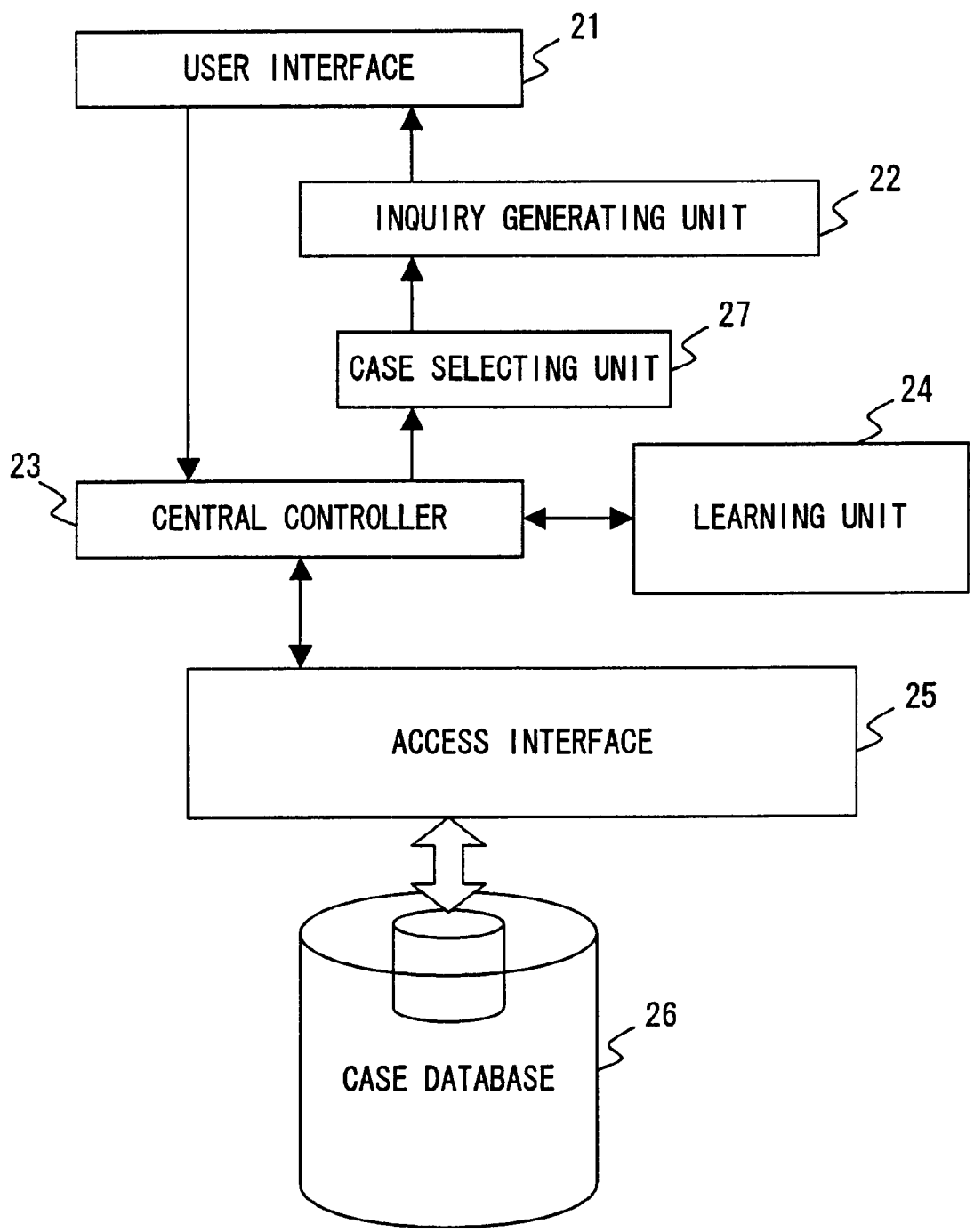
F I G. 5

| ID | FLAG | CATEGORY | DEGREE OF CERTAINTY | CONTENTS |
|---|---|---|---|---|
| • | ○ | A | (70%) | positive, 3, +, a,... |
| • | ○ | not A | (89%) | positive, 2.8, -, a,... |
| 3 | ○ | not A | (87%) | negative, 4, +, b,... |
| : | : | : | : | : |
| : | : | : | : | : |
| : | : | : | : | : |
| 5001 | × | notA | 20% | positive, 5, -, c,... |
| 5002 | × | notA | 82% | negative, 3.5, +, a,... |
| 5003 | × | A | 57% | negative, 4, -, b,... |
| • | × | A | 69% | positive, 4.2, -, b,... |
| : | : | : | : | : |
| : | : | : | : | : |
| : | : | : | : | : |

FIG. 7

| ID | FLAG | CATEGORY | DEGREE OF CERTAINTY | CONTENTS |
|---|---|---|---|---|
| • | O | A | 85% | positive, 3, +, a,... |
| • | × | not A | 57% | positive, 2.8, -, a,... |
| 3 | × | not A | 88% | negative, 4, +, b,... |
| : | : | : | : | : |
| : | : | : | : | : |
| : | : | : | : | : |
| 5001 | × | A | 57% | positive, 5, -, c,... |
| 5002 | × | notA | 68% | negative, 3.5, +, a,... |
| 5003 | O | notA | 71% | negative, 4, -, b,... |
| • | × | A | 90% | positive, 4.2, -, b,... |
| : | : | : | : | : |
| : | : | : | : | : |
| : | : | : | : | : |

FIG. 9

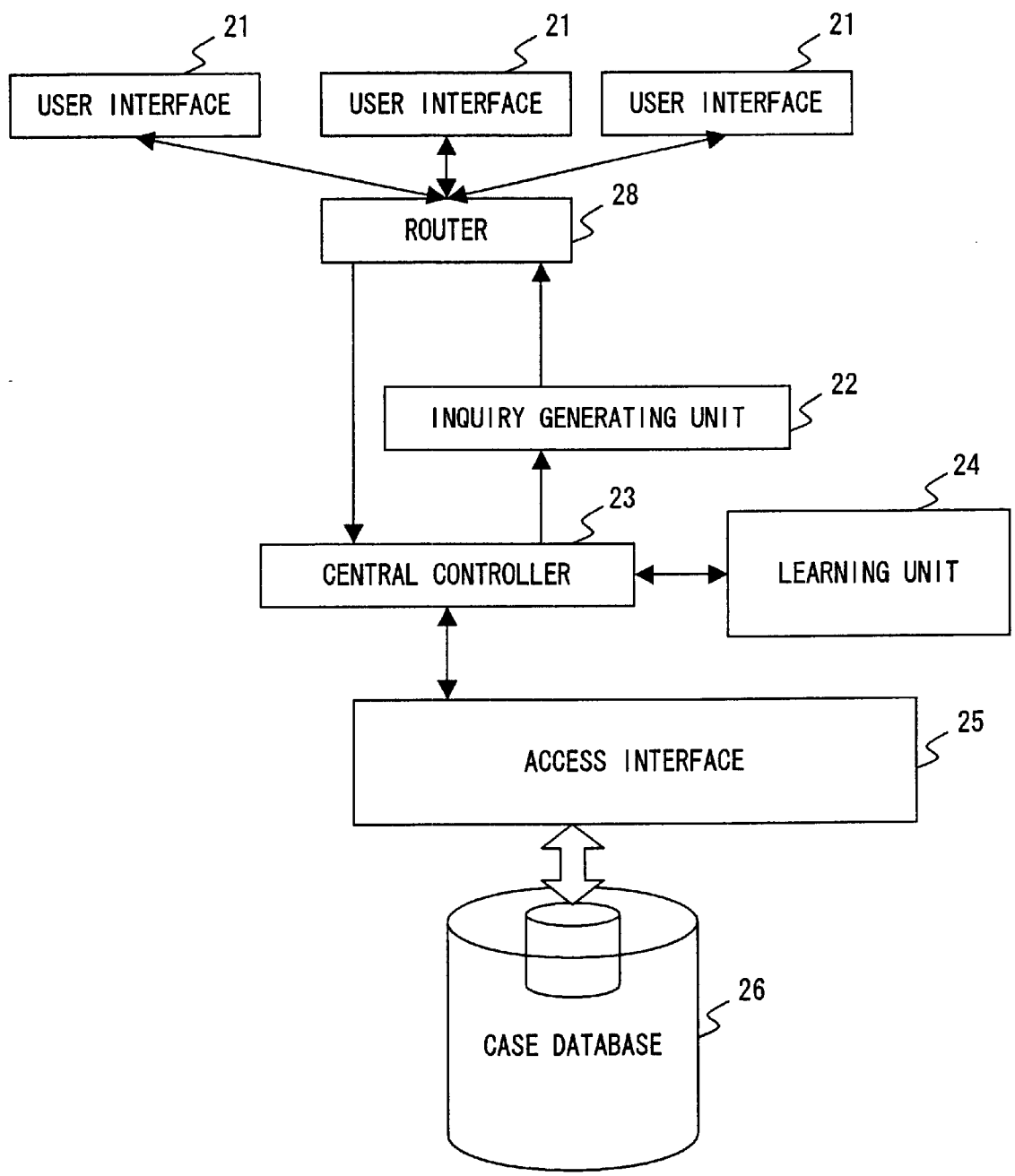
F I G. 10

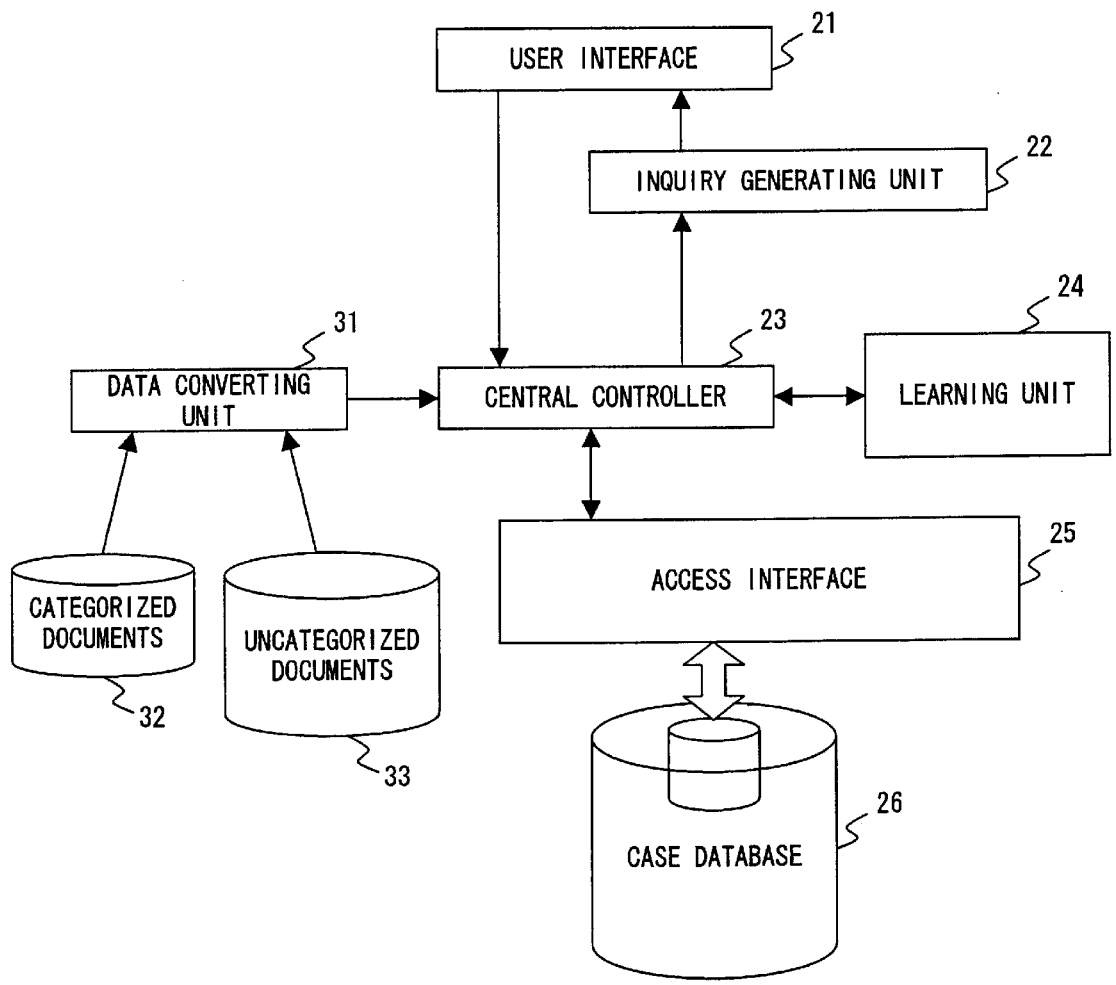
F I G. 1 4

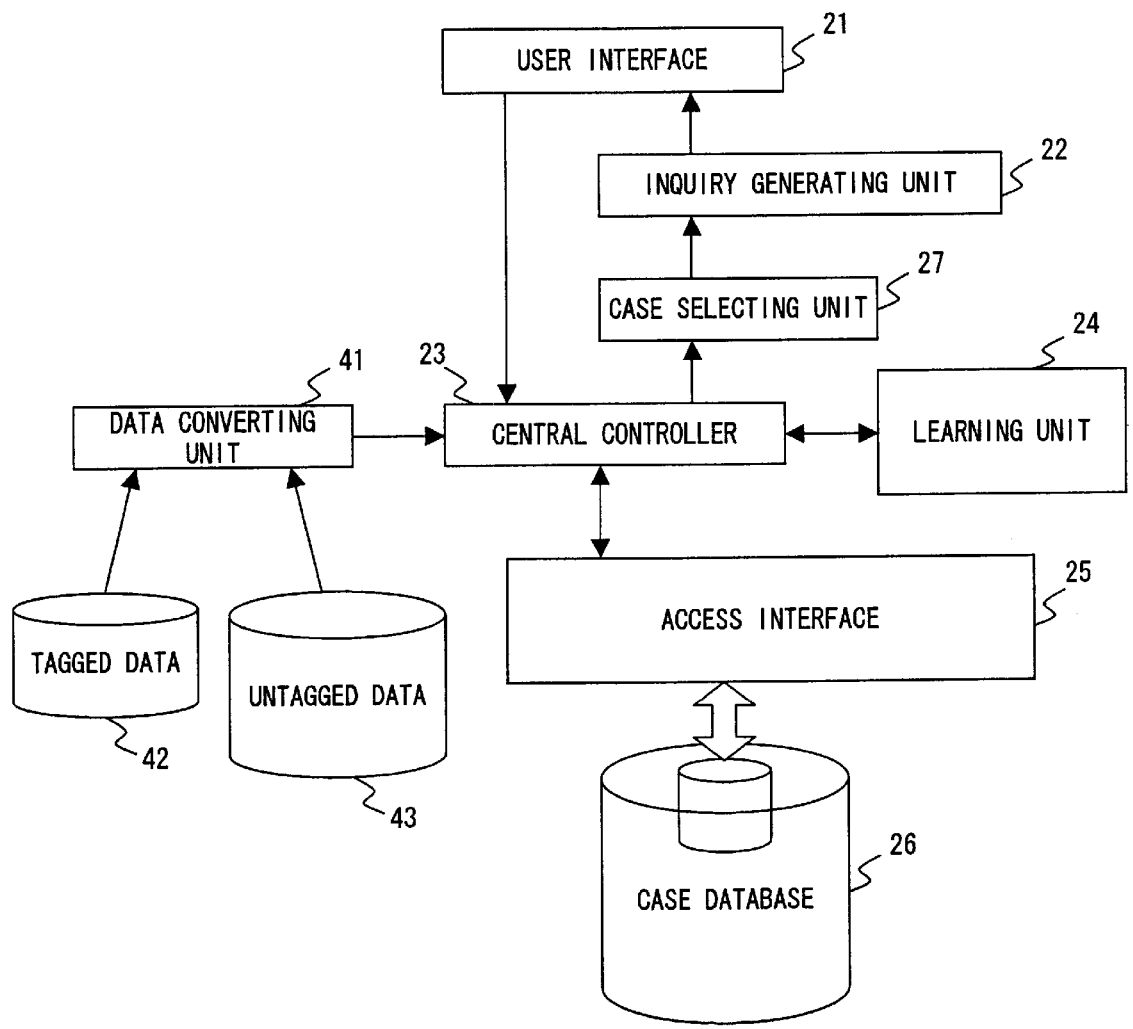
F I G. 1 7

ON <TIME REPRESENTATION> DECEMBER 2 </TIME REPRESENTATION>, AT <PLACE NAME> KOIWA STATION </PLACE NAME>, I MET <PERSON'S NAME> MR. MAEDA </PERSON'S NAME> BY AN APPOINTMENT. HE SEEMED NOT TO SLEEP A WINK ON THE PREVIOUS DAY, AND HE BEGAN TO SLEEP WITH HIS ARMS FOLDED THE MOMENT HE SAT AT MY SIDE.
I REACHED <PLACE NAME> AIRPORT STATION </PLACE NAME> BEFORE I FOUND THAT MY CONSCIOUSNESS HAD FADED AWAY. I HAVE TWO HOURS UNTIL TAKE-OFF, BUT I AM NOT HUNGRY. I CHECKED IN AT THE COUNTER OF <COMPANY NAME> B AIRWAYS </COMPANY NAME>.

42

↓

DATA CONVERTING UNIT — 41

↓

44

| ID | | FLAG | CATEGORY (DEGREE OF CERTAINTY) | CONTENTS (PART OF SPEECH, PRECEDING PART OF SPEECH, SUCCEEDING PART OF SPEECH) |
|---|---|---|---|---|
| 1 | (DECEMBER 2) | ○ | TIME PRESENTATION (90%) | NOUN, PREPOSITION, COMMA,... |
| 2 | (KOIWA STATION) | ○ | PLACE NAME (93%) | PLACE NAME, PREPOSITION, COMMA,... |
| 3 | (MR. MAEDA) | ○ | PERSON'S NAME (72%) | PERSON'S NAME, VERB, PREPOSITION,... |
| 4 | (HE) | ○ | else (95%) | PRONOUN, PERIOD, VERB,... |
| 5 | (PREVIOUS DAY) | ○ | else (82%) | NOUN, ARTICLE, COMMA,... |
| 6 | (ARMS) | ○ | else (90%) | NOUN, PRONOUN, ADJECTIVE,... |
| 7 | (SIDE) | ○ | else (70%) | NOUN, PRONOUN, PERIOD,... |
| 8 | (I) | ○ | else (92%) | PRONOUN, PERIOD, VERB,... |
| 9 | (AIRPORT STATION) | ○ | PLACE NAME (62%) | PLACE NAME, VERB, CONJUNCTION,... |
| 10 | (CONSCIOUSNESS) | ○ | else (85%) | NOUN, PRONOUN, AUXILIARY VERB,... |
| 11 | (B AIRWAYS) | ○ | COMPANY NAME (95%) | COMPANY NAME, PREPOSITION, PERIOD,... |

FIG. 18

ON DECEMBER 2, AT KOIWA STATION, I MET <PERSON'S NAME> MR. MAEDA </PERSON'S NAME> BY AN APPOINTMENT. HE SEEMED NOT TO SLEEP A WINK...

ABOVE TAG IS CORRECT?

45 — YES       NO — 46

*EXPECTED TO BE CORRECT ANSWER WITH 83% PROBABILITY JUDGING FROM CURRENT LEARNING RESULTS

F I G. 1 9

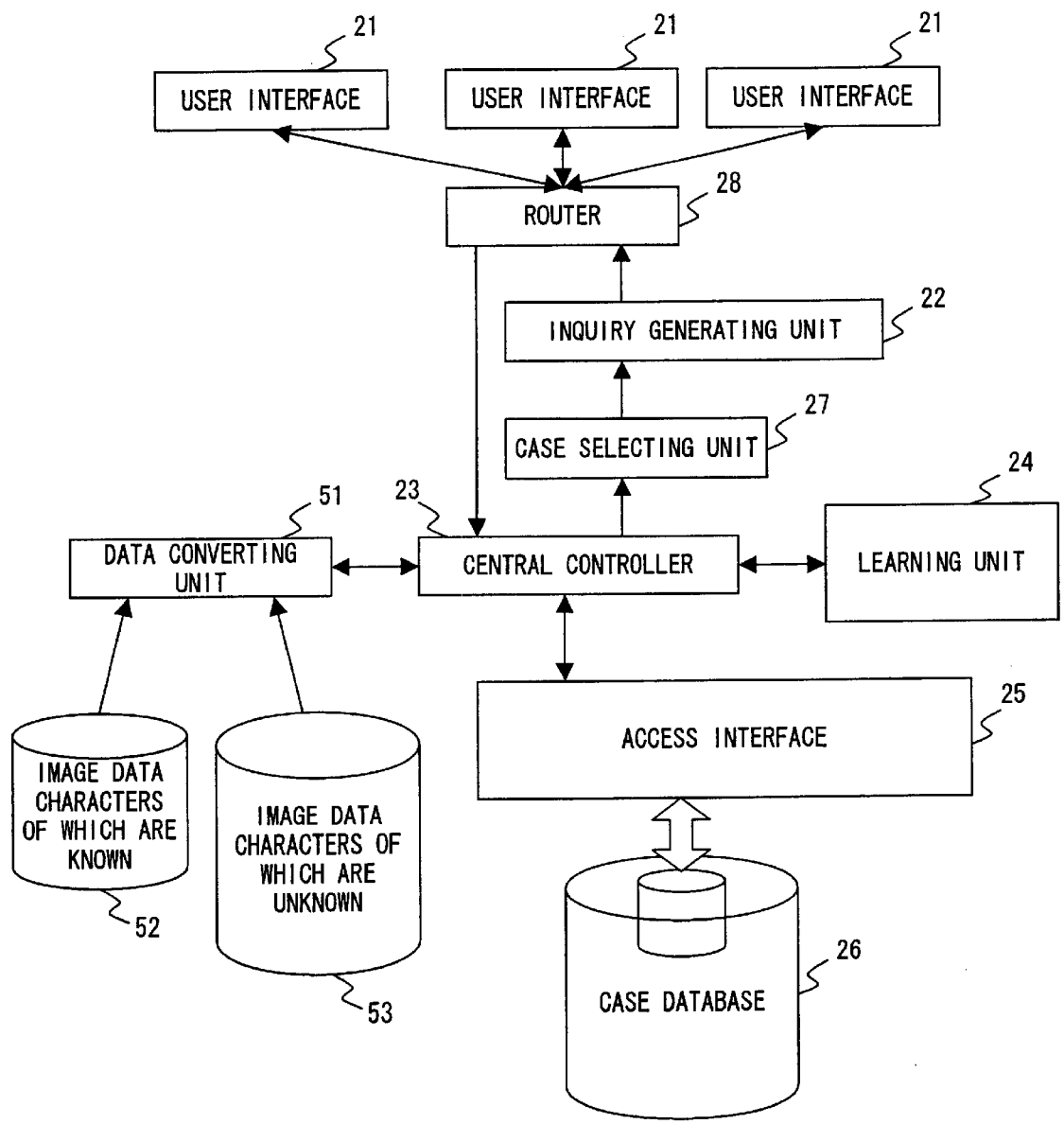
F I G. 2 0

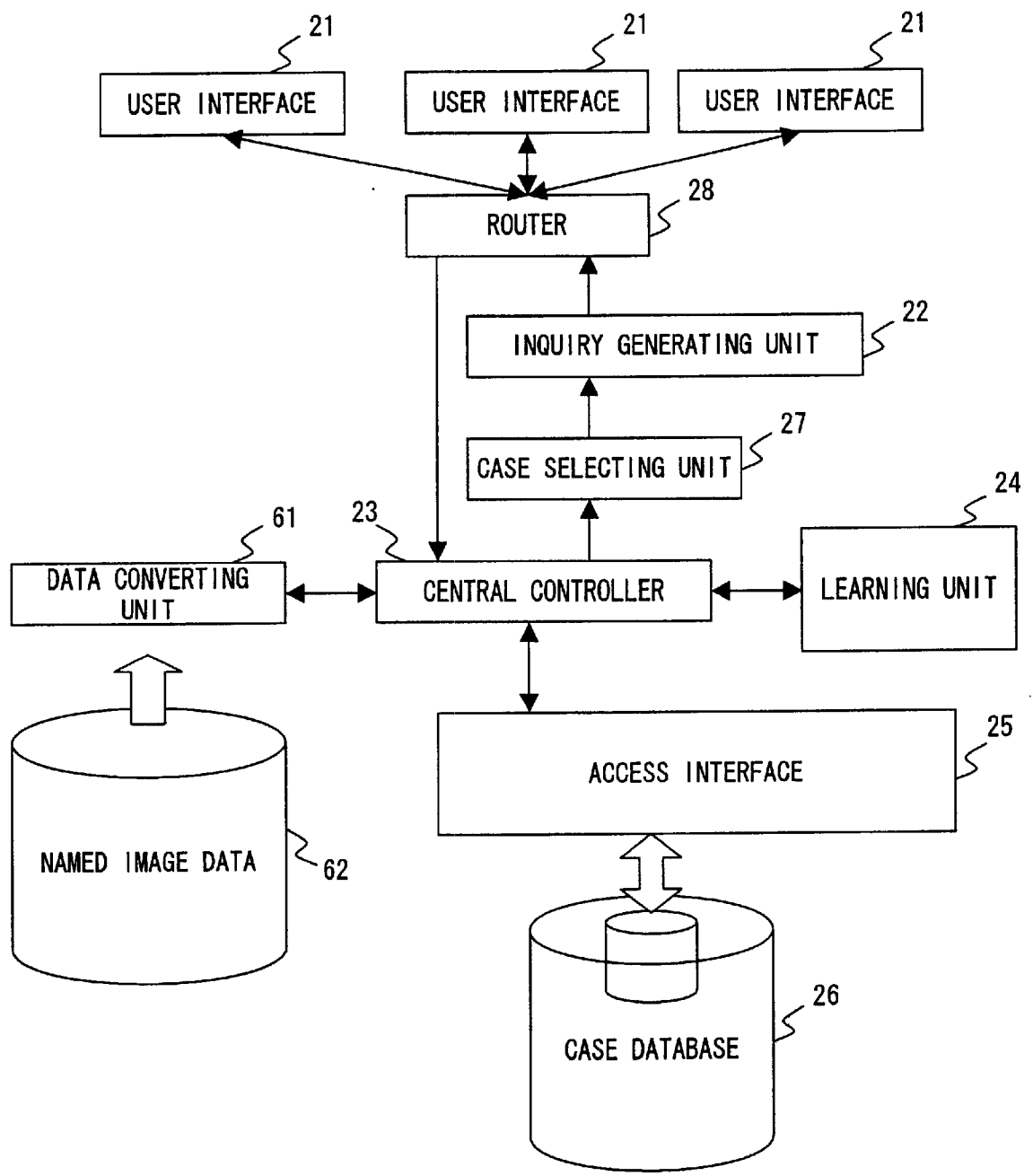
F I G. 23

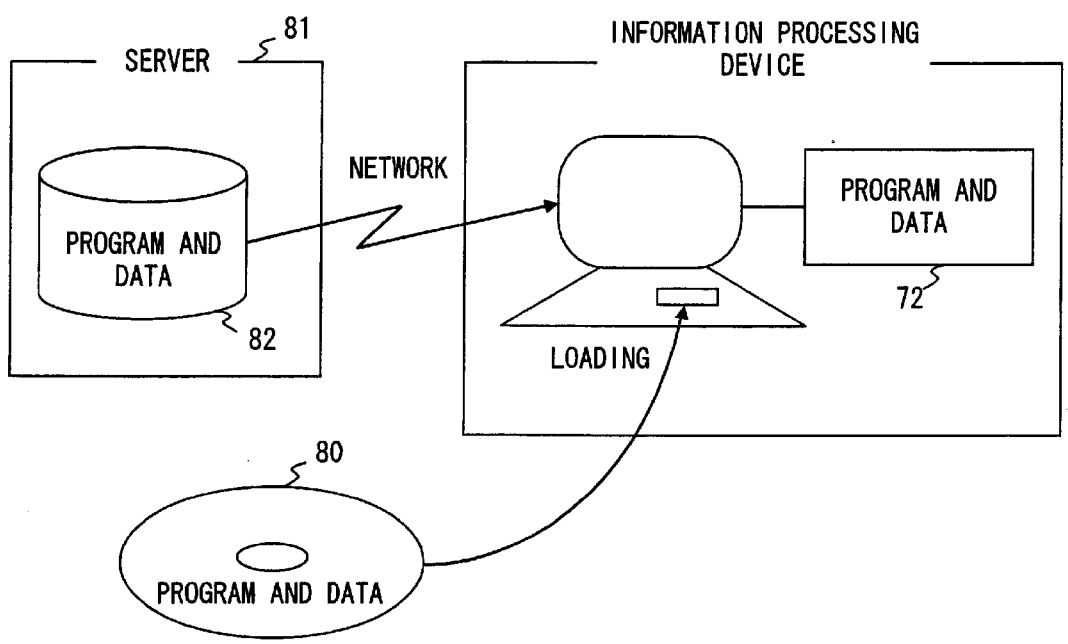
F I G. 2 5

APPARATUS AND METHOD ACCUMULATING CASES TO BE LEARNED

BACKGROUND OF THE INVENTION

Field of the Invention

The present invention relates to a technique for extracting statistical information from a correct answer case, and for preparing a case that a learning device making an inference about an unknown case uses as a learning target. Here, a correct answer case corresponds to a case whose characteristic to be inferred is already known, whereas an unknown case corresponds to a case whose characteristic to be inferred is not known.

Particularly, the present invention relates to a case accumulating apparatus and method preparing a correct answer case in the case that whether an inference result is a correct answer is clear to a human being, but unclear to a machine, such as the case of text classified by a field, tagged text, a correspondence between an image file and a character in optical character recognition (OCR), a name of an object represented by an image, etc.

A variety of methods performing learning from a correct answer case with a statistical method, and making an inference for an unknown case have been proposed as stated below.

(1) A method to automatically classify a document, preparing a correct answer document group the field of which is determined, generating a statistical standard (inference rule) for classification from the prepared correct answer document group by using a statistical estimation method (learning) such as an appearance frequency of a word, etc., and estimating the field of an unknown document by using the standard. The statistical standard for classification may not always be human-readable. A weight of a neural network, a combination of keywords in principal component analysis, or the like may be available.

(2) A method to filter documents, using a process classifying a document required by a user and a document not required by the user, generating a statistical standard for classification by using the information about a word that is considered to be a clue for the determination at that time, and filtering a new document by using the standard.

(3) A method to automatically tag a text, preparing tagged correct answer text, generating a standard for tagging by using the information about a word in the vicinity of a tag, etc., and tagging an untagged document by using the standard.

(4) A method to implement OCR with high accuracy, preparing a correspondence between an image file and a correct answer character, generating a standard for recognition from the correspondence by using the information about a line element, etc., and determining to which character an unknown image file corresponds by using the standard.

(5) A method to determine a name or a characteristic such as a color, etc. of an object represented by an image, preparing a pair of an image file and a determination result of a correct answer, generating a determination standard by using pixel information from the pair, and determining to which determination result an unknown image belongs by using the standard.

These methods can be considered to be frameworks for recognizing a correct answer case to belong to a certain category, extracting a correspondence between the characteristic of a case and the category of a correct answer, and inferring the category of an unknown case by using the correspondence. For such frameworks, diverse techniques have been proposed to improve the accuracy of an inference.

By way of example, as far as automatic document classification is concerned, Japanese Patent Application Publications Nos. 5-54037, 5-233706, 5-324726, 6-131225, 6-348755, 7-36897, 7-36767, 7-49875, 7-78186, 7-114572, 7-19202, 8-153121, etc. are cited.

However, the above described conventional inference methods have the following problems.

These methods assume the case where a sufficiently large number of correct answer cases exist, and significant information for categorization can be extracted from the correct answer cases. However, for example, if Web or in-house documents are classified in document classification, the number of categories sometimes ranges from several hundreds to several thousands. For the categories, it requires a considerable amount of labor to prepare a sufficiently large quantity of correct answer cases (at least 100 cases for each category) for generating an inference rule with sufficiently high accuracy.

Additionally, as frameworks for presenting information that appears to be a clue for an inference, and for making an inquiry to a user, apparatuses recited by Japanese Patent Application Publications Nos. 9-22414, 9-153049, etc. exist. However, these are not the frameworks for efficiently generating a correct answer case in cooperation between a learning device and a user. With these apparatuses, correct answer cases cannot be accumulated with simple operations.

Furthermore, for a tagged corpus (a database of tagged texts), it is difficult to prepare a sufficiently large quantity of text examples for generating a tagging rule with high accuracy. Similarly, for Japanese character recognition in OCR, the number of types of characters reaches as many as several thousands. Therefore, it is difficult to prepare a sufficiently large quantity of correct answers with which a rule for recognition can be generated for each character.

Normally, if a sufficiently large quantity of correct answer cases do not exist, a good inference algorithm or a good characteristic with which a correct answer rate becomes as high as possible is searched in many cases. However, if a sufficiently large quantity of correct answer cases do not exist, an inference with high accuracy cannot be made with any method in most cases. In this case, correct answer cases are forced to be manually accumulated. Accordingly, it is vital to determine a way of efficiently performing a process for accumulating correct answer cases.

SUMMARY OF THE INVENTION

An object of the present invention is to provide a case accumulating apparatus and method efficiently accumulating a sufficiently large quantity of correct answer cases based on a small number of correct answer cases in order to generate an inference rule with high accuracy, even when only the small number of correct answer cases exist.

A case accumulating apparatus according to the present invention comprises a storage device, a learning device, an inquiry device, and a control device.

The storage device stores information about a set of correct answer cases. The learning device generates an inference rule while referencing the information stored in the storage device, and infers a target characteristic from a known characteristic of a case to be inferred in compliance with the inference rule.

The inquiry device inquires of a user as to whether or not an inference result of the learning device is correct, and receives a response from the user. The control device determines the target characteristic of the case to be inferred based on the response, and adds information about the case to be inferred including the determined target characteristic to the information about the set of correct answer cases.

BRIEF DESCRIPTION OF THE DRAWINGS

FIG. 2 shows the configuration of a first case accumulating apparatus;

FIG. 4 exemplifies a first case data table;

FIG. 5 shows the configuration of a second case accumulating apparatus;

FIG. 7 exemplifies a second case data table;

FIG. 9 exemplifies a third case data table;

FIG. 10 shows the configuration of a first case accumulating system;

FIG. 14 shows the configuration of a third case accumulating apparatus;

FIG. 17 shows the configuration of a fourth case accumulating apparatus;

FIG. 18 exemplifies second data conversion;

FIG. 19 exemplifies a second display screen;

FIG. 20 shows the configuration of a third case accumulating system;

FIG. 23 shows the configuration of a fourth case accumulating system;

FIG. 25 shows storage media.

DESCRIPTION OF THE PREFERRED EMBODIMENTS

Hereinafter, preferred embodiments according to the present invention are described in detail with reference to the drawings.

Figure 1:
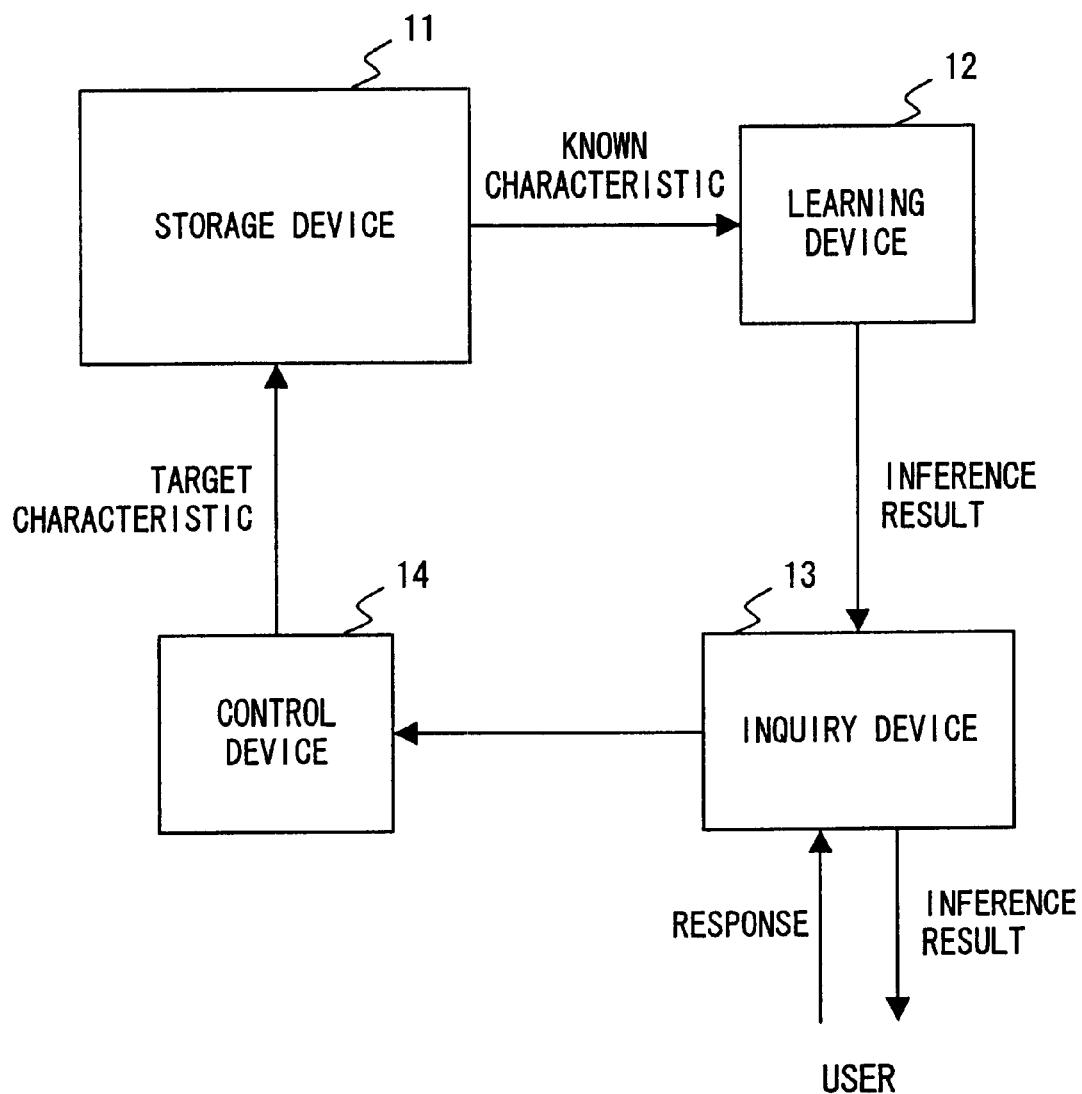
FIG. 1 shows the principle of a case accumulating apparatus according to the present invention.

FIG. 1 shows the principle of a case accumulating apparatus according to the present invention. A case accumulating apparatus shown in FIG. 1 comprises a storage device 11, a learning device 12, an inquiry device 13, and a control device 14.

The storage device 11 stores information about a set of correct answer cases. The learning device 12 generates an inference rule while referencing the information stored in the storage device 11, and infers a target characteristic from a known characteristic of a case to be inferred in compliance with the inference rule.

The inquiry device 13 inquires of a user as to whether or not an inference result of the learning device 12 is correct, and receives a response from the user. The control device 14 determines the target characteristic of the case to be inferred based on the response, and adds information about the case to be inferred including the determined target characteristic to the information about the set of correct answer cases.

The storage device 11 stores, for example, a correspondence between a known characteristic and a target characteristic of each correct answer case. Combinations of a case, a known characteristic, and a target characteristic include the following.

(1) a document, the characteristic of the document, and the category of the document (2) tagged text data, the characteristic of the text data, and the category of the tag (3) an image, the characteristic of the image (a feature amount extracted from the image), and a character represented by the image (4) an image, the characteristic of the image, and a name of an object represented by the image The learning device 12 generates an inference rule for inferring a target characteristic from a known characteristic based on the correspondence between a known characteristic and a target characteristic, which is stored in the storage device 11. Then, the learning device 12 infers the target characteristic of a different case by applying the inference rule to the different case having the known characteristic, and outputs an inference result. At this time, as another case to be inferred, an unknown case or a correct answer case that can possibly be erroneous is used.

The inquiry device 13 receives the inference result output from the learning device 12, and requests a user to determine whether or not the received inference result is correct. The inquiry device 13 then receives a determination result input by the user as a response. If the inference result is not correct, the user can input a correct target characteristic as a response along with the determination result.

If the user determines that the inference result is correct, the control device 14 stores the correspondence between the known characteristic used for the inference and the inferred target characteristic in the storage device 11 as information about a correct answer case. If the user determines that the inference result is not correct, and modifies the inferred target characteristic, the control device 14 stores the correspondence between the known characteristic used for the inference and the modified target characteristic in the storage device 11 as information about a correct answer case.

With such a case accumulating apparatus, a user can efficiently accumulate correct answer cases only by repeating a simple operation for inputting a determination result of correctness/incorrectness for a presented inference result. Furthermore, an inference rule is regenerated by using a newly accumulated correct answer case, thereby gradually improving the accuracy of an inference rule.

For example, the storage device 11 shown in FIG. 1 corresponds to a case database 26 that is shown in FIG. 2 and will be described later, the learning device 12 shown in FIG. 1 corresponds to a learning unit 24 shown in FIG. 2, the inquiry device 13 shown in FIG. 1 corresponds to a user interface 21 and an inquiry generating unit 22, which are shown in FIG. 2, and the control device 14 shown in FIG. 1 corresponds to a central controller 23 shown in FIG. 2.

A case accumulating apparatus according to a preferred embodiment comprises a device (learning unit) generating an inference rule for inferring a category (a target characteristic) from a correct answer case, a database accumulating information about each case, and an interface requesting a user to make a determination, wherein a correct answer case is prepared by presenting an inference result of an unknown case to a user, and by registering a determination result of the user.

The case accumulating apparatus prepares a small number of correct answer cases in advance for each category, learns an inference rule by using the cases, presents to a user a result obtained by applying the inference rule to an unknown case, so that the user determines whether or not the result is correct, or modifies the result. Such a process is repeated. The only operation that the user must perform is to simply put a mark "○" (correct) or "x" (incorrect) for a presented inference result. Furthermore, as correct answer cases are accumulated, most results will belong to "○". Accordingly, correct answer cases can be efficiently accumulated with simple operations.

As an inference rule algorithm, by way of example, a decision tree, a decision list, a neural network, naive Bayes, a Bayesian network, a genetic algorithm, case-based reasoning, a least square method, regression analysis, boosting, bagging, a support vector machine, etc. are used.

FIG. 2 shows the configuration of such a case accumulating apparatus. The case accumulating apparatus shown in FIG. 2 comprises a user interface 21, an inquiry generating unit 22, a central controller 23, a learning unit 24, an access interface 25, and a case database 26.

The central controller 23 controls the inquiry generating unit 22, the learning unit 24, and the access interface 25. The learning unit 24 generates an inference rule for determining a category from a correct answer case based on an instruction from the central controller 23, and infers the category of an unknown case. The case database 26 accumulates the information about each case. The access interface 25 accesses the information stored in the case database 26 based on an instruction from the central controller 23.

The inquiry generating unit 22 generates an inquiry for requesting a user to determine whether or not an inference result of an unknown case is correct based on an instruction from the central controller 23. The user interface 21 displays the inquiry on its screen. The user interface 21 then notifies the central controller 23 of a determination result input by the user as a response. The access interface 25 registers this determination result to the case database 26. If the user authorizes the inferred category of the unknown case, this case is registered as a new correct answer case.

Figure 3:
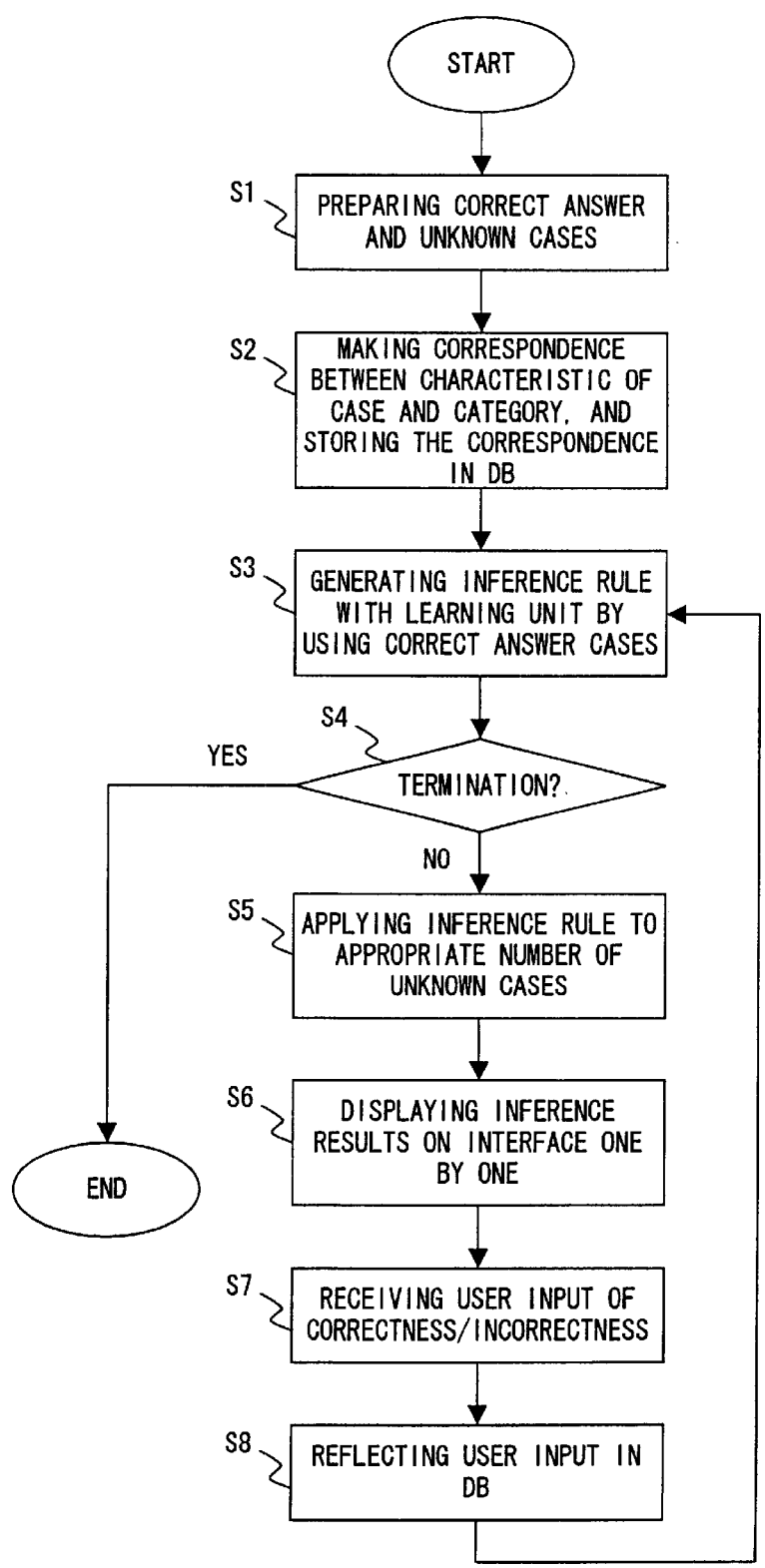
FIG. 3 is a flowchart showing a first accumulation process.

FIG. 3 is a flowchart showing an accumulation process performed by the case accumulating apparatus shown in FIG. 2. Firstly, a user prepares a set of correct answer cases and a set of unknown cases (step S1). Correspondences between the characteristics of the cases and their categories are stored in the case database (DB) 26 (step S2).

Next, the learning unit 24 generates an inference rule by using the correct answer cases stored in the case database 26 (step S3). The central controller 23 determines whether or not a termination condition is satisfied (step S4). Examples of the termination condition include the following.

(1) A value of a necessary correction answer rate is preset. The case accumulating apparatus presents to a user a result obtained by applying a generated inference rule to an unknown case, and registers the rate at which inference results are correct when making the user modify an inference result. If the value of the rate exceeds the preset correct answer rate, the process is terminated.

(2) A value of a necessary correct answer rate is preset, and a correct answer case unused for learning is separately generated. If the correct answer rate of a result obtained by applying a generated inference rule to the correct answer case exceeds the preset correct answer rate, the process is terminated.

If the termination condition is not satisfied, the central controller 23 then extracts an appropriate number of unknown cases yet to be processed from the case database 26, and provides the learning unit 24 with the extracted cases. The learning unit 24 applies the generated inference rule to the provided unknown cases, and infers their categories (step S5). At this time, the inferred categories are registered to the case database 26.

Next, the inquiry generating unit 22 displays the inference results of the unknown cases on the screen of the user interface 21 one by one, and requests the user to determine whether or not each of the inference results is correct (step S6). When the user inputs a determination result "○" or "x" (step S7), the central controller 23 reflects the input determination result in the case database 26 (step S8). Then, the case accumulating apparatus repeats the operations in and after step S3. If the termination condition is satisfied in step S4, the process is terminated.

In this process, the case database 26 stores case data, for example, in the form of a case data table shown in FIG. 4. In FIG. 4, data in each row corresponds to one piece of case data, and each case data includes identification information (ID) of a case, a flag, a category to which the case belongs, and the contents of the case. The flag among these information items C; indicates whether or not a corresponding case is a correct answer case, and the contents indicate the information (known characteristic) that is actually included in the case.

A case having a flag "○" corresponds to a correct answer case that is prepared beforehand, or an unknown case whose category has already been inferred and whose inference result has been determined by a user. In other words, this flag indicates that an inquiry to a user is unnecessary. In the meantime, a case having a flag "x" corresponds to an unknown case yet to be processed, which has not been inferred yet. Namely, this flag indicates that an inquiry to a user is necessary.

If the determination result of the inferred category is correct in step S7, the unknown case becomes a correct answer case unchanged. Therefore, the corresponding flag is rewritten from "x" to "○". Or, if the determination result is incorrect, the category is modified by the user. In this case, the corresponding flag is rewritten from "x" to "○", and the inferred category is rewritten to the category specified by the user. In this way, the unknown case presented to the user is accumulated as a correct answer case, and almost all of the originally prepared unknown cases will be converted into correct answer cases by the time the process is terminated.

Not all of unknown cases, but only a case that a machine is difficult to learn may be automatically selected with a statistical method, and a user determination may be requested. For example, when a learning device outputs the degree of certainty of an inference result, the case accumulating apparatus presents to a user only a result having a low degree of certainty as a result of applying an inference rule to an unknown case, and requests the user of his or her determination. Then, the case accumulating apparatus adds the determination result, and regenerates an inference rule.

If a correct category is assigned to an unknown case with a low degree of certainty, an inference rule is generated by adding this case to correct answer cases. As a result, an inference rule with a high correct answer rate is generated from a small number of correct answer cases and a determination requiring a small amount of labor. Normally, if a case having a low degree of certainty is learned, the accuracy of an inference rule generated by a learning device tends to increase.

Here, for the degree of certainty, the fact that the degree of certainty of a sample that is difficult to be learned is apt to be lower is adopted. For example, many learning devices can return the degree of certainty as exemplified by the following documents.

(1) A decision tree recited by Quinlan, "C4.5: Programs for Machine Learning," Morgan kaufmann (1993).
(2) A neural network recited by Rumelhart, McClelland "Parallel distributed processing: exploration in the microstructure of cognition," MIT Press (1986).
(3) A boosting algorithm recited by Freund, Schapire "Experiments with a New Boosting Algorithm," Machine Learning: Proceedings of the Thirteenth International Conference (1996).

Using the value of the degree of certainty allows a machine to determine a case that is easy to the machine (a case having a high degree of certainty), and also allows a human being to determine only a case that the machine is difficult to determine (a case having a low degree of certainty). That is, a human being does not determine inference results of all of unknown cases. Accordingly, correct answer cases can be accumulated with a small amount of labor.

Figure 6:
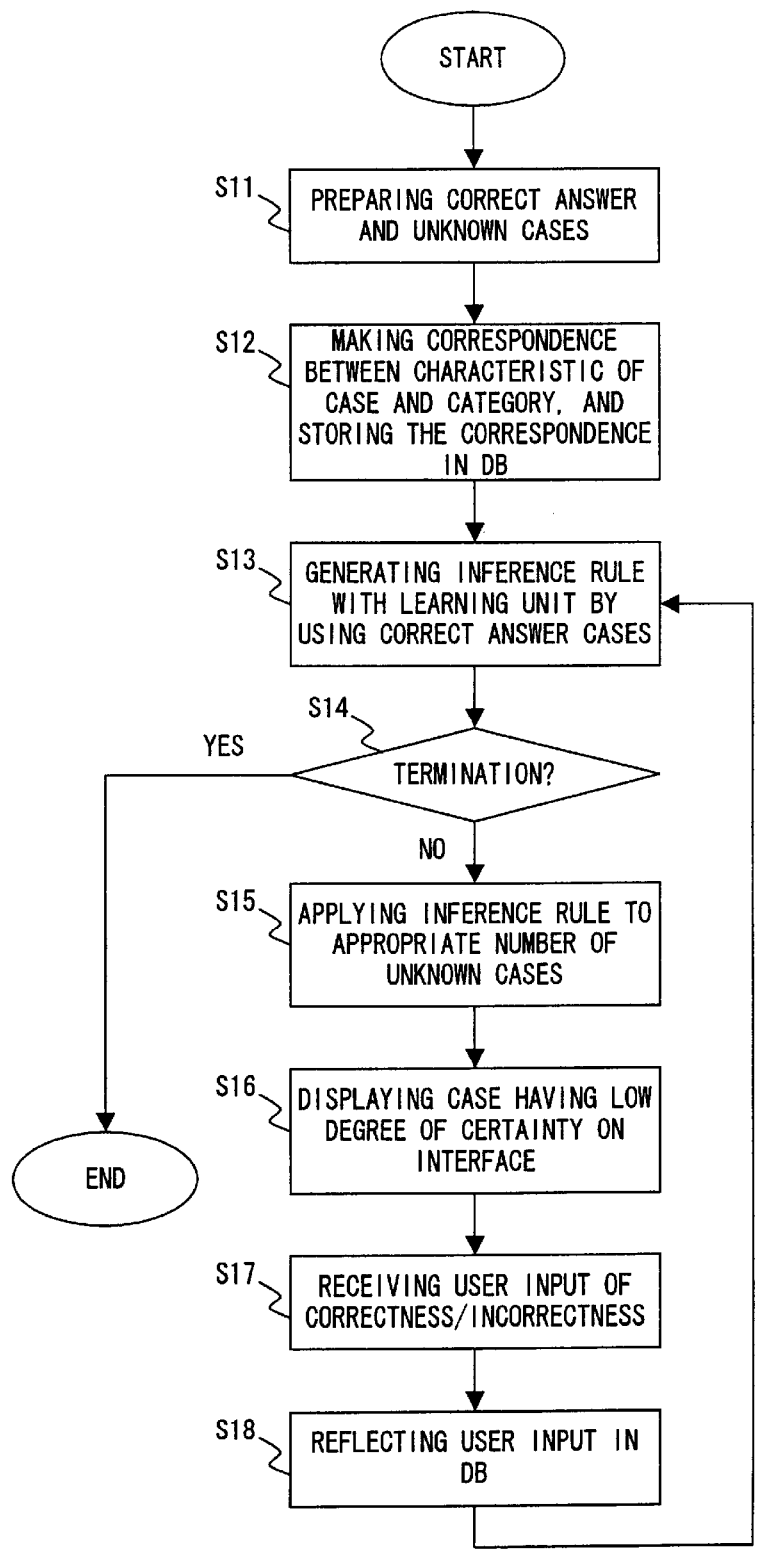
FIG. 6 is a flowchart showing a second accumulation process.

FIG. 5 shows the configuration of such a case accumulating apparatus. The case accumulating apparatus shown in FIG. 5 has a configuration in which a case selecting unit 27 is added to the configuration shown in FIG. 2, and performs a process shown in FIG. 6. In the flowchart shown in FIG. 6, operations in steps S11 to S15, and S17 to S18 are similar to those in steps S1 to S5, and S7 to S8 of FIG. 3.

When an inferred category and the degree of certainty are registered to the case database 26 in step S15, the case selecting unit 27 checks the degree of certainty of each case output from the learning unit 24 based on an instruction from the central controller 23 (step S16). Then, the case selecting unit 27 selects cases whose degrees of certainty are lower than a predetermined value, and provides the inquiry generating unit 22 with their inference results. The inquiry generating unit 22 displays the received inference results of the unknown cases on the screen of the user interface 21 one by one, and requests the user to determine whether or not each of the inference results is correct.

In this case, the case database 26 stores case data, for example, in the form of a case data table shown in FIG. 7. The case data table shown in FIG. 7 has a form in which an item of the degree of certainty is added to the information items shown in FIG. 4. A case having a flag "x" corresponds to an unknown case whose category has been inferred, but whose inference result has not yet determined by a user.

Furthermore, even if some quantity of correct answer cases are originally prepared, they may sometimes include errors that cannot be disregarded. In this case, the case accumulating apparatus generates an inference rule from a set of correct answer cases including errors by using a learning unit. Then, the case accumulating apparatus determines a result obtained by applying the generated inference rule to the correct answer cases, presents to a user a case having a low degree of certainty, and requests the user to determine whether or not the result is correct.

In this way, errors included in a set of correct answer cases can be reduced, and an inference rule having high accuracy can be generated. Normally, since an inference result having a low degree of certainty can probably be an error, correct answer cases including a small number of errors can be obtained with a smaller amount of labor compared with the case that all inference results are checked.

Figure 8:
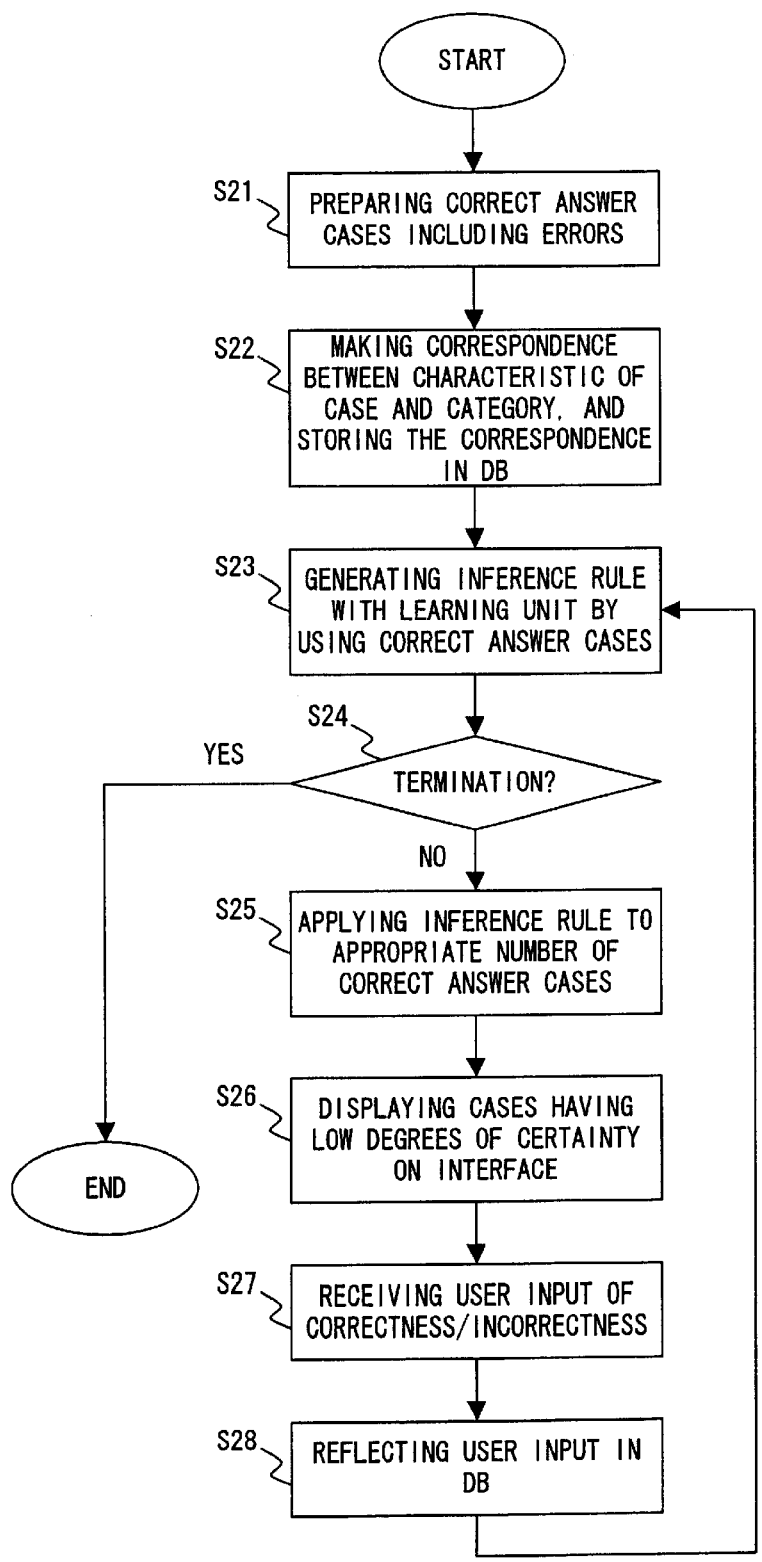
FIG. 8 is a flowchart showing a third accumulation process.

FIG. 8 is a flowchart showing such a process. In the flowchart shown in FIG. 8, operations in steps S22 to S24, and S27 to S28 are similar to those in steps S2 to S4, and S7 to S8 of FIG. 3.

Instep S21, a user prepares a set of correct answer cases including errors, and inputs the prepared set to the case accumulating apparatus. If a termination condition is not satisfied in step S4, the central controller 23 extracts an appropriate number of correct answer cases yet to be processed from the case database 26, and provides the learning unit 24 with the extracted correct answer cases. The learning unit 24 infers the categories by applying an inference rule to the provided correct answer cases (step S25). At this time, the inferred categories and the degrees of certainty are registered to the case database 26.

Next, the case selecting unit 27 checks the degree of certainty of each of the cases output from the learning unit 24, selects cases having the degrees of certainty, which are lower than a predetermined value, and provides the inquiry generating unit 22 with their inference results (step S26). The inquiry generating unit 22 then displays the inference results of the received cases on the screen of the user interface 21 one by one, and requests the user to determine whether or not each of the inference results is correct.

FIG. 9 exemplifies a case data table stored in the case database 26. A flag shown in FIG. 9 indicates whether or not an inference result has been determined by a user. A case having a flag "○" corresponds to a case whose category has been inferred, and whose inference result has been determined by a user. In other words, this flag represents that an inquiry to a user is unnecessary. In the meantime, a case having a flag "x" corresponds to a case that has not determined by a user yet. This flag represents that an inquiry to a user is necessary.

If a determination result of an inferred category is correct in step S27, the corresponding flag is rewritten from "x" to "○". If the determination result is incorrect, the corresponding flag is rewritten from "x" to "○", and the inferred category is rewritten to a category specified by the user. In this way, the category of a correct answer case including an error is modified.

For the above described case accumulating apparatus, only one user interface is arranged. However, a plurality of user interfaces may be connected to the case accumulating apparatus via a communications network, and a plurality of users may use the case accumulating apparatus. With such a system, a plurality of users can share an operation for determining an inference result, whereby correct answer cases can be accumulated more efficiently.

FIG. 10 shows a case accumulating system in which a plurality of user interfaces are connected to the case accumulating apparatus shown in FIG. 2. In FIG. 10, a router 28 is arranged on a communications network, and relays a communication between each of user interfaces 21 and a central controller 23 or an inquiry generating unit 22.

Figure 11:
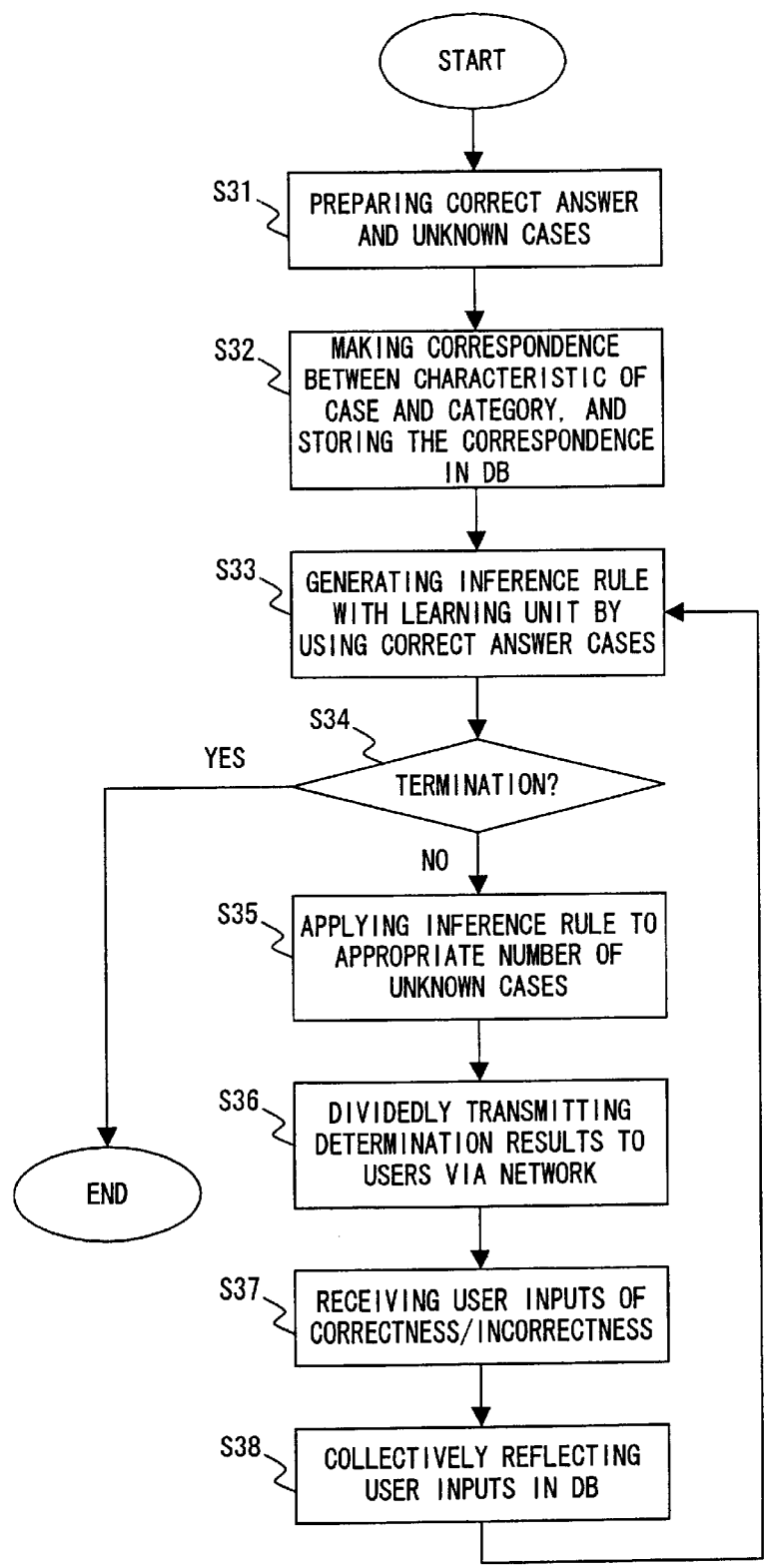
FIG. 11 is a flowchart showing a fourth accumulation process.

FIG. 11 is a flowchart sowing an accumulation process performed by the case accumulating system shown in FIG. 10. In the flowchart shown in FIG. 11, operations in steps S31 to S35 are similar to those in steps S1 to S5 of FIG. 3.

When inferred categories are registered to the case database 26 in step S35, the inquiry generating unit 22 dividedly transmits inference results of a plurality of unknown cases to the plurality of user interfaces 23 via the router 28, and requests each user to determine whether or not an inference result is correct (step S36). When each user inputs a determination result "∘" or "×" and transmits the determination result to the central controller 23 via the router 28 (step S37), the central controller 23 collectively reflects received determination results in the case database 26 (step S38)

Figure 12:
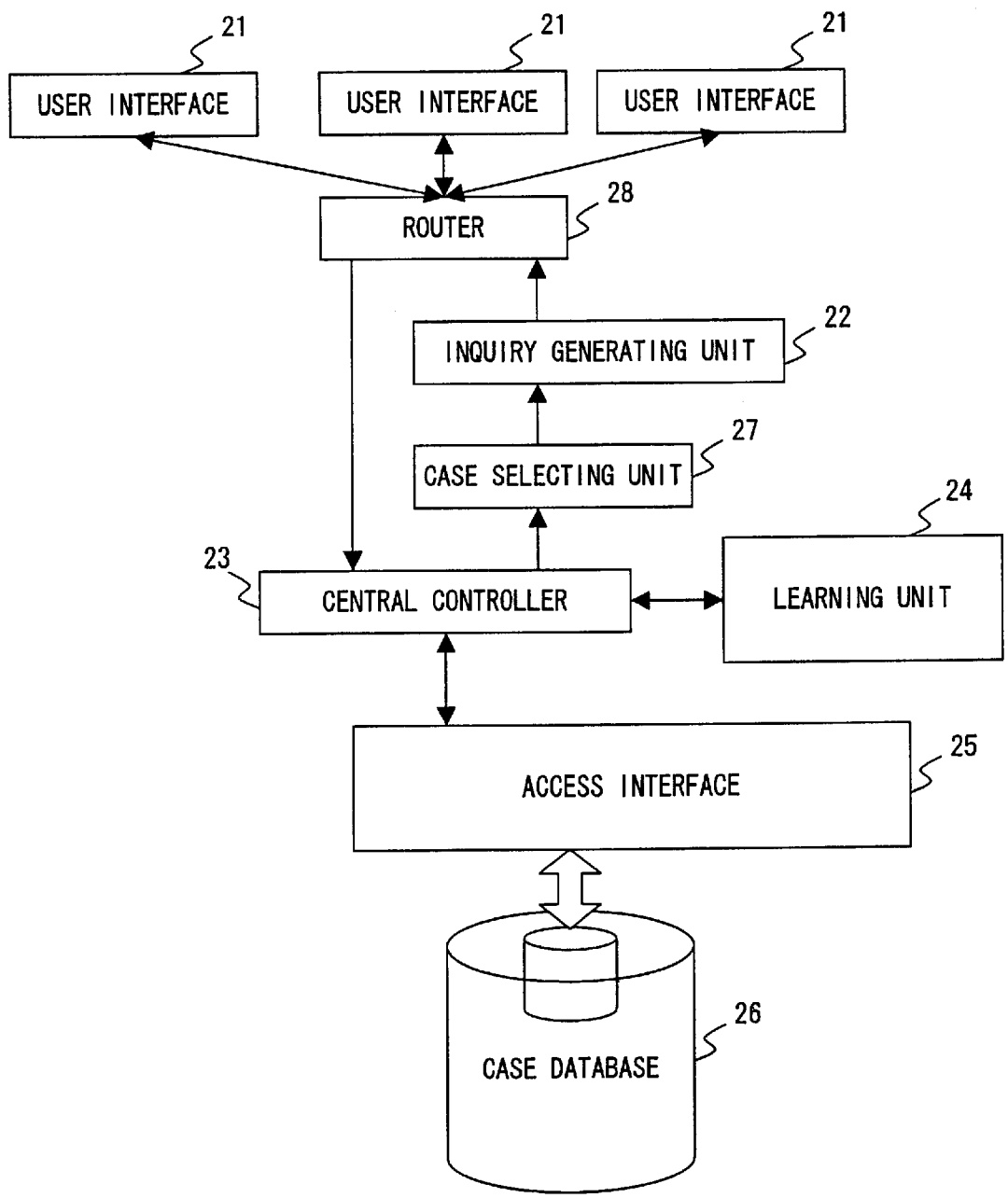
FIG. 12 shows the configuration of a second case accumulating system.
Figure 13:
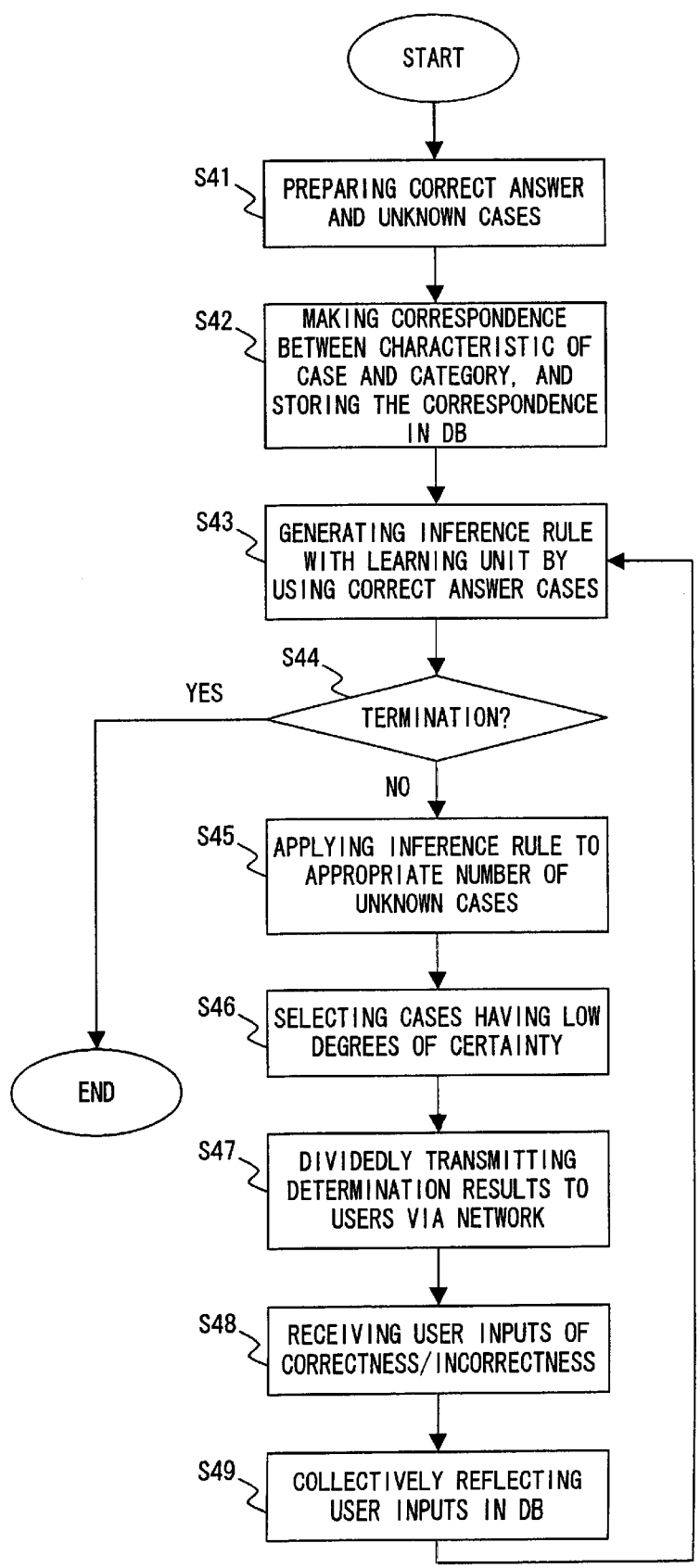
FIG. 13 is a flowchart showing a fifth accumulation process.

FIG. 12 shows a case accumulating system in which a plurality of user interfaces are connected to the case accumulating apparatus shown in FIG. 5. This system performs a process shown in FIG. 13. In the flowchart shown in FIG. 13, operations in steps S41 to S45 are similar to those in steps S11 to S15 of FIG. 6.

When inferred categories and the degrees of certainty are registered to the case database 26, the case selecting unit 27 checks the degrees of certainty of the respective cases output from the learning unit 24, selects cases having the degrees of certainty, which are lower than a predetermined value, and provides the inquiry generating unit 22 with their inferred results (step S46). Thereafter, the case accumulating system performs operations in steps S47 to S49, which are similar to those in steps S36 to S38 of FIG. 11.

Next, application examples of the above described case accumulating apparatuses and systems are explained with reference to FIGS. 14 through 23. The case accumulating apparatuses shown in FIGS. 2 and 5 and the case accumulating systems shown in FIGS. 10 and 12 are applicable to an arbitrary process such as document classification, text tagging, OCR, image recognition, etc.

FIG. 14 shows the configuration where document classification is made by using the case accumulating apparatus shown in FIG. 2. The case accumulating apparatus shown in FIG. 14 has a configuration where a data converting unit 31 is added to the configuration shown in FIG. 2. Here, assume the case where the number of types of classification categories is 1,000, and a condition that one document sample may belong to a plurality of categories is provided in order to prepare correct answer cases for generating a classification rule for a Web document. In this case, procedural steps of a process targeting a category "information" are as follows.

Figure 15:
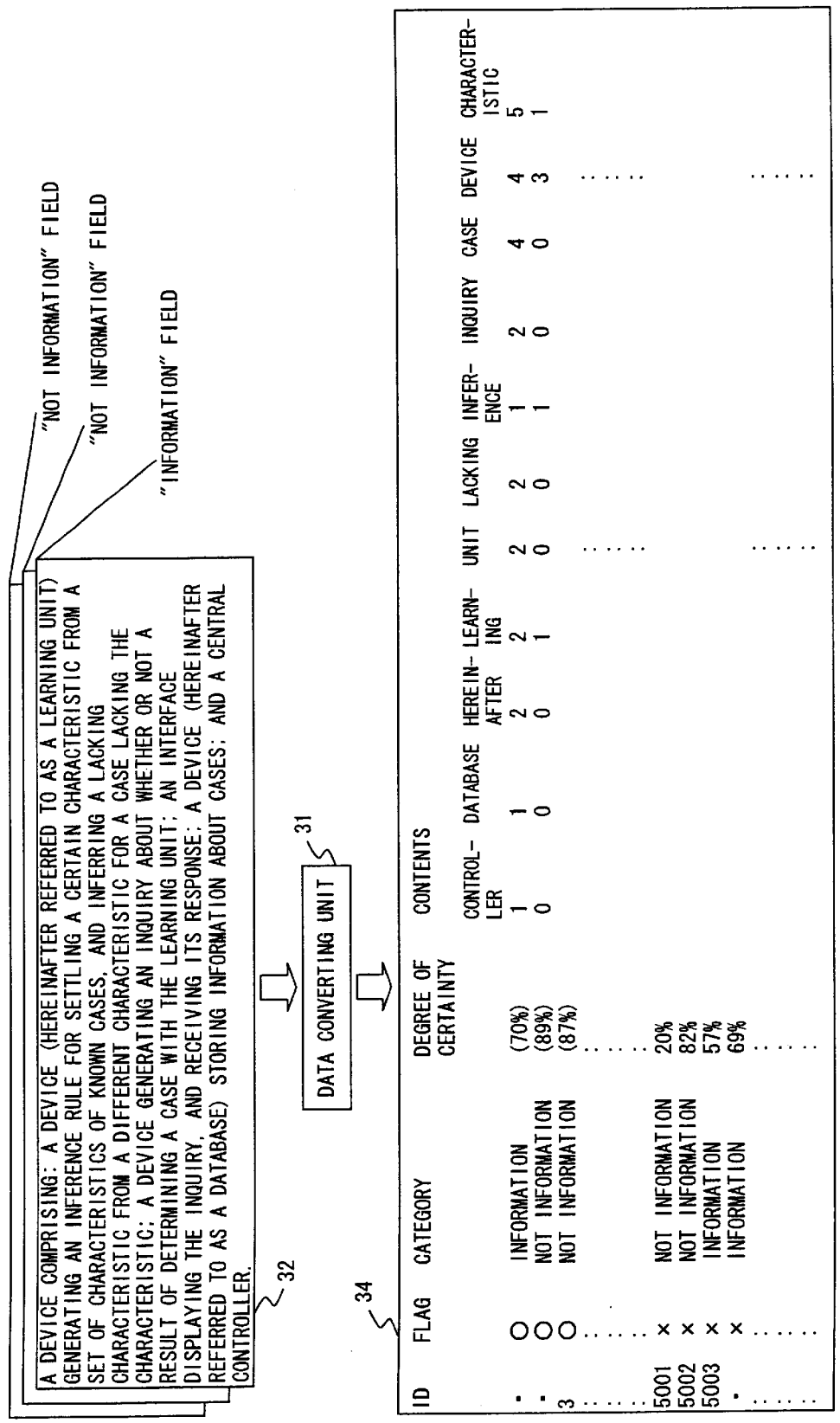
FIG. 15 exemplifies first data conversion.
Figure 16:
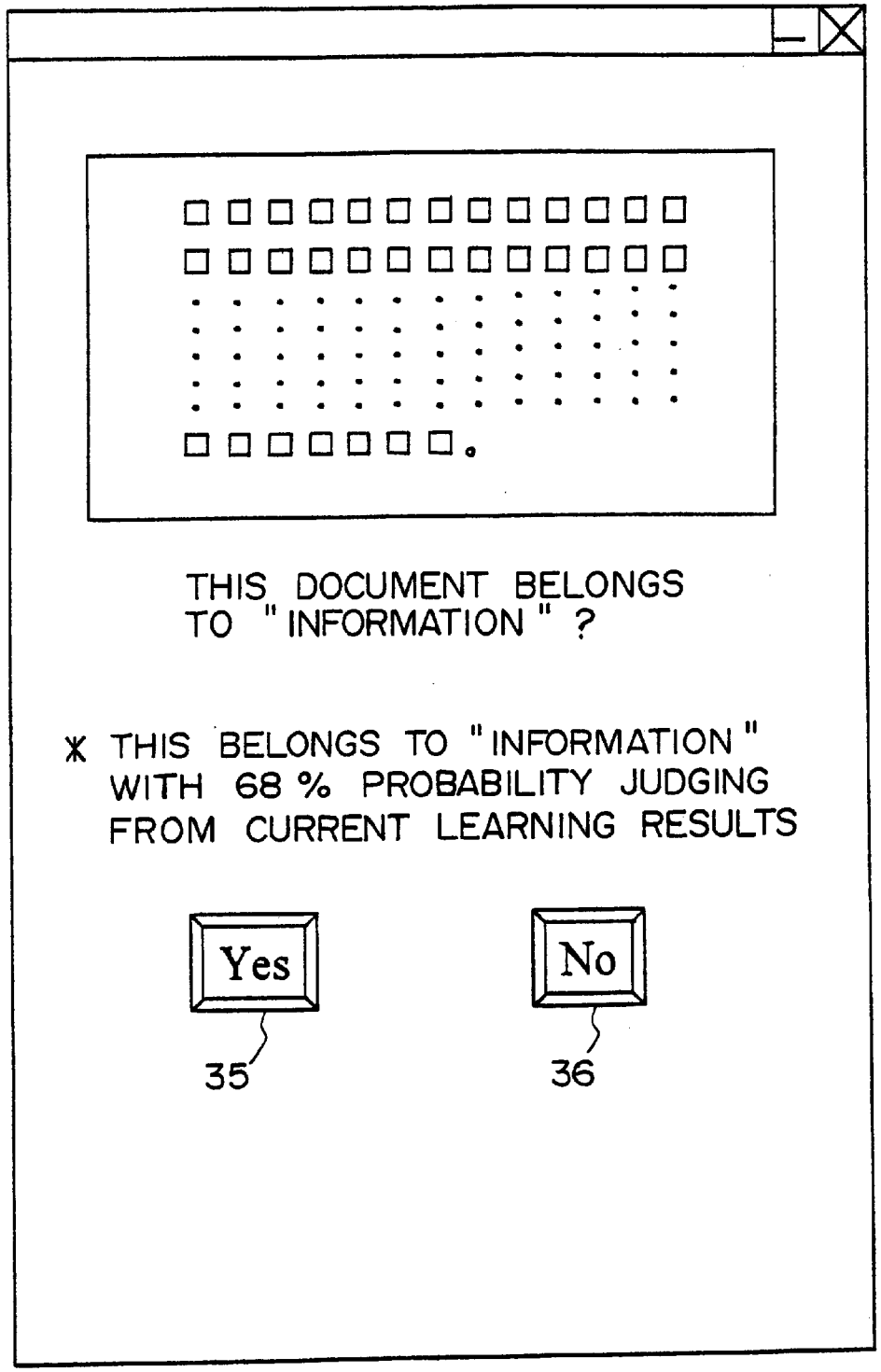
FIG. 16 exemplifies a first display screen.

1. A user appropriately prepares 5,000 documents, and picks all documents belonging to the category "information" from among the prepared documents. For example, if 10 documents are picked, the remaining 4,990 documents are recognized to be documents belonging to categories other than the category "information". These 5,000 documents correspond to a set of correct answer cases prepared beforehand, and are stored as categorized documents 32. Additionally, the user prepares 10,000 documents whose belonging categories have not been checked yet. These 10,000 documents correspond to a set of unknown cases, and are stored as uncategorized documents 33.
2. The data converting unit 31 converts the information about the categorized documents 32 into the form of a case data table 34 as shown in FIG. 15. Here, categories other than "information" are collectively registered as "not information", and the numbers of times that particular words such as a "controller", a "database", etc., appear in each of the documents are registered as the contents of each of the documents. Furthermore, in this example, the degree of certainty is not always required, and may be omitted. Also the information about the uncategorized documents 33 are similarly converted, and registered to the case data table 34, which is stored in the case database 26.
3. The learning unit 24 generates an inference rule for determining whether or not a document belongs to "information" by using the documents whose categories are known (originally 5,000 documents).
4. The central controller 23 arbitrarily selects 1,000 documents from among the 10,000 documents that the learning unit 24 has not checked. The learning unit 24 then determines whether or not these 1,000 documents belong to "information" by using the obtained inference rule.
5. The inquiry generating unit 22 presents to the user the determination results of the 1,000 documents by sequentially displaying them on the screen shown in FIG. 16. The user determines whether or not the results are correct, and inputs determination results by clicking a "Yes" button 35 or a "No" button 36. The inquiry generating unit 22 can collectively present to the user the documents that the learning unit 24 determines to belong to "information".
6. Assume that the user determines the categories of 2 documents among the presented documents to belong to the category "information", and also determines the categories of the remaining 998 documents to belong to "not information". In this case, the number of documents belonging to "information" results in 12, since the new 2 documents are added to the original 10 documents. The number of documents belonging to "not information" results in 5,988, since the new 998 documents are added to the original 4,990 documents. The operations in and after the procedural step 3 are repeated by using these 6,000 documents as correct answer cases.

A portion that cannot be automatically performed in this process is only a determination made by a user, except for the preparation of the original some pieces of data (small numbers of documents belonging to "information" and documents not belonging to "information"). However, this determination is a very simple operation and a group of correctly categorized documents can be accumulated only by repeating this operation.

FIG. 17 shows the configuration where a text is tagged with the case accumulating apparatus shown in FIG. 5. The case accumulating apparatus shown in FIG. 17 has a configuration where a data converting unit 41 is added to the configuration shown in FIG. 5.

For example, if a system automatically tagging a time representation, a place name, a person's name, a company name, etc. within a document is constructed, a rule for determining which text data to be extracted is required. If such a rule is generated by a human being, it costs high. Therefore, it is better to perform learning from correct answer text data.

However, since also generation of correct answer text data requires cost, a small number of pieces of tagged data 42 with tags such as a time representation, etc., and a large number of pieces of untagged data 43 without tags are prepared, and input to the case accumulating apparatus. The tagged data 42 corresponds to correct answer cases prepared beforehand, whereas the untagged data 43 correspond to unknown cases.

The case accumulating apparatus first reads the tagged data 42, and the data converting unit 41 converts the tagged data 42 into the form of a case data table 44 as shown in FIG. 18.

Here, particular text data (character string) within the document corresponds to one case, and "time representation", "place name", "person's name", "company name", and "else" correspond to categories. "else" among these tags indicates categories other than the time representation, the place name, the person's name, and the company name. Text data belonging to "time representation", "place name", "person's name", or "company name" is recognized to be tagged data, and text data belonging to "else" is recognized to be untagged data.

Furthermore, a part of speech of a character string, and those of preceding and succeeding character strings are registered as the contents of each text data. These parts of speech represent the characteristics of sections within the document. Also the untagged data 43 are similarly converted, and registered to the case database table 44, which is stored in the case database 26.

Next, the learning unit 24 generates an inference rule by using the text data whose categories are settled, and infers which tag is attached to the text data corresponding to the untagged data 43 by using the inference rule.

The case selecting unit 27 selects inferred tags having low degrees of certainty from among the text data whose tags have been inferred. The inquiry generating unit 22 presents the inferred tags to a user by sequentially displaying them on a screen shown in FIG. 19. The user determines whether or not the presented tags are correct, and inputs determination results by clicking a "Yes" button 45 or a "No" button 46. If any of the presented tags is incorrect, the user specifies which tag to be attached. The case accumulating apparatus reflects the determination results in the case data table 44 as correct answer cases, and repeats similar operations.

FIG. 20 shows the configuration where an OCR process is performed with the case accumulating system shown in FIG. 12. The case accumulating system shown in FIG. has a configuration where a data converting unit 51 is added to the configuration shown in FIG. 12. Assume the case where data for which a correspondence between the image of a character and the code of the character is made is prepared to identify the character from the image information of the character.

In this case, a user prepares image data 52 that are corresponded to character codes (image data characters of which are known), and image data 53 that are not corresponded to character codes (image data characters of which are unknown), and inputs the prepared data to the case accumulating apparatus. The image data 52 correspond to correct answer cases prepared beforehand, whereas the image data 53 correspond to unknown cases.

Figure 21:
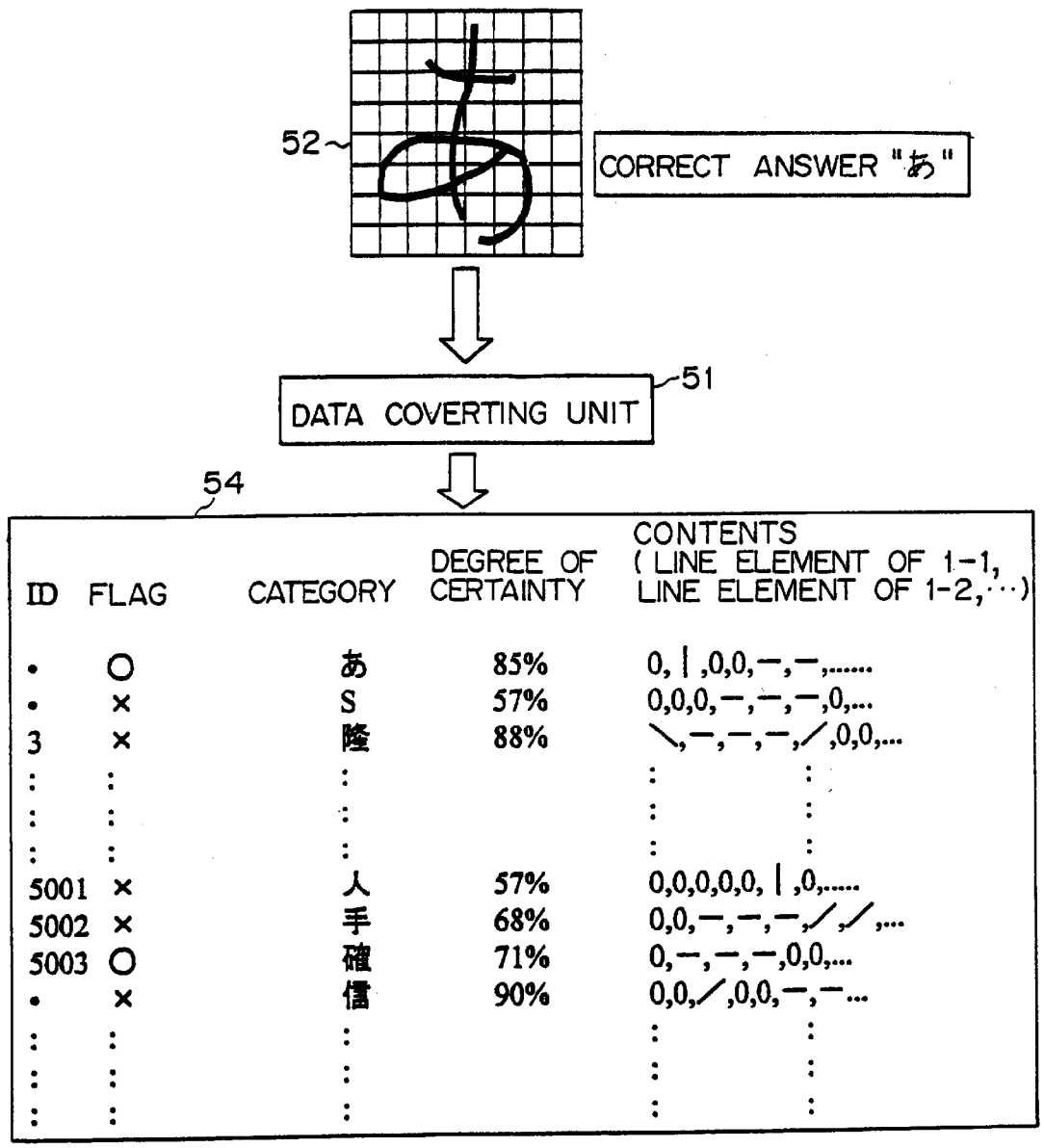
FIG. 21 exemplifies third data conversion.

The case accumulating system first reads the image data 52, and the data converting unit 51 converts the image data 52 into the form of a case data table 54 as shown in FIG. 21. Here, the image data of a character corresponds to one case, and the character code representing a correct answer character corresponds to a category. Furthermore, information about a line element extracted from each region when image data is divided into a plurality of regions is registered as the contents of each image data. Also the image data 53 are similarly converted, and registered to the case data table 54, which is stored in the case database 26.

Next, the learning unit 24 generates an inference rule by using the image data whose categories are settled, and infers characters to which the image data 53 correspond to, by using the generated inference rule.

Figure 22:
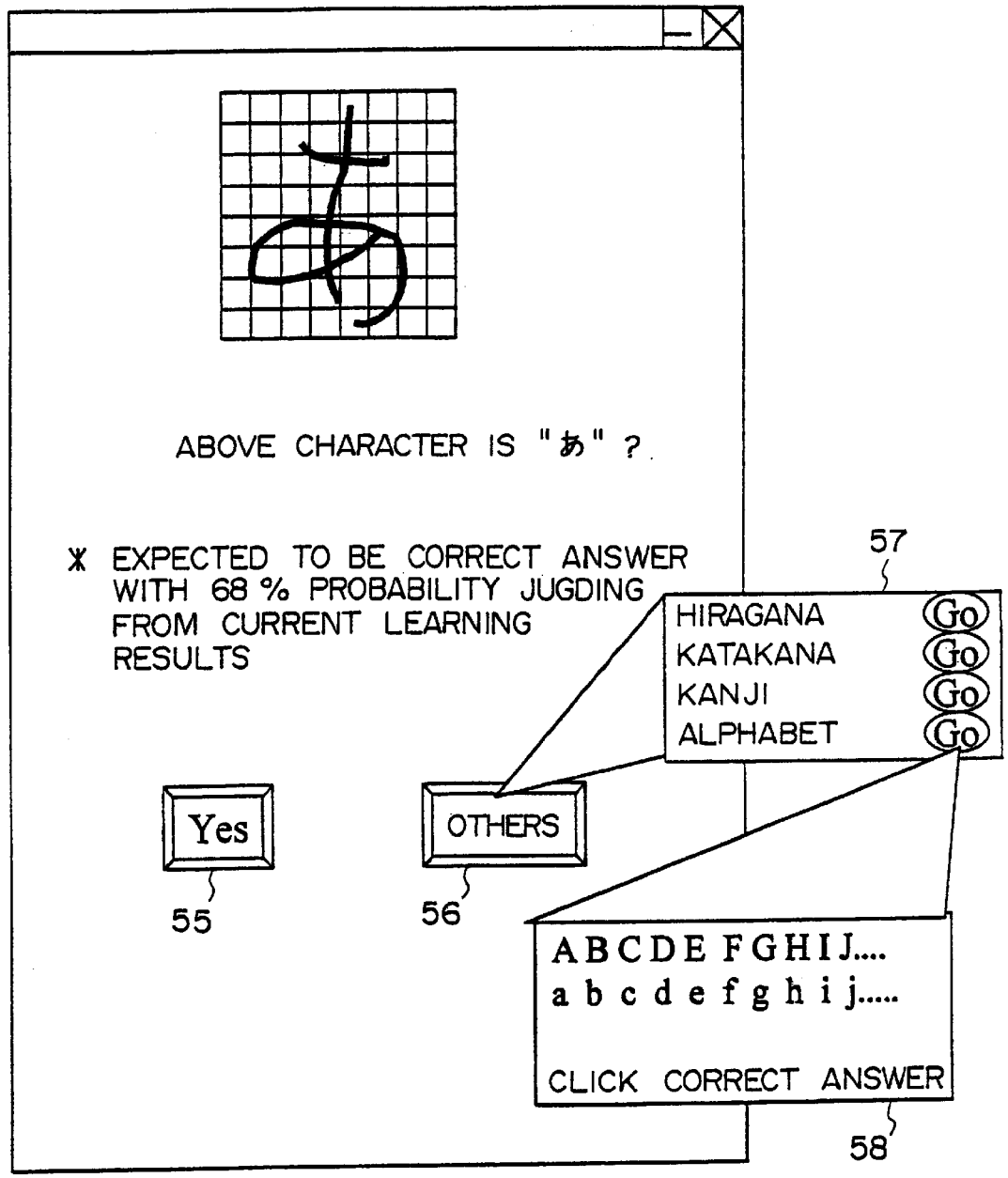
FIG. 22 exemplifies a third display screen.

The case selecting unit 27 selects data having a low degree of certainty from among the image data the characters of which have been inferred. The inquiry generating unit 22 generates screen information with which inferred characters are presented to users, and dividedly transmits the information to a plurality of users via the router 28. At this time, a screen shown in FIG. 22 is displayed on each of user interfaces 21. Each of the plurality of users determines whether or not a presented character is correct, and inputs a determination result by clicking a "Yes" button 55 or an "others" button 56.

When the user clicks the "others" button 56, the inquiry generating unit 22 displays a character type selection menu 57. When the user selects an alphabet, an alphabet selection menu 58 is displayed. The user then specifies a correct answer character by clicking a character included in the selection menu 58.

The central controller 23 collects the determination results of the plurality of users via the router 28, reflects them in the case data table 54 as correct answer cases, and repeats similar operations.

FIG. 23 shows the configuration where image recognition is performed by using the case accumulating apparatus shown in FIG. 12. The case accumulating system shown in FIG. 23 has a configuration where a data converting unit 61 is added to the configuration shown in FIG. 12.

For example, photographs of many commodities are posted on a site such as an online shopping site on the Web, etc., and names such as a "bag", etc. are assigned thereto. However, these names are not always unified, and may sometimes include errors. Furthermore, the number of names may be limited in some cases. In such cases, procedural steps of a process for assigning a name to an image of a commodity are as follows.

1. A user prepares named image data 62. The named image data 62 correspond to a set of correct answer cases some of which include errors.
2. The data converting unit 61 extracts an image characteristic such as a color, an edge, etc. from each image data, generates a case data table in which a correspondence between an image characteristic and a name is registered, and stores the case data table in the case database 26.
3. The learning unit 24 generates an inference rule for inferring the name of a commodity from the image characteristic by using all of cases stored in the case database 26.
4. The case selecting unit 27 selects data having low degrees of certainty from among the image data whose names have been inferred. The inquiry generating unit 22 generates screen information with which inferred names are presented to users, and dividedly transmits the generated information to a plurality of users via the router 28.
5. Each of the plurality of users determines whether or not a presented name is correct, and inputs a determination result. If the presented name is incorrect at this time, the user specifies a correct name.
6. The central controller 23 collects the determination results of the plurality of users via the router 28, reflects them in the case database 26 as correct answer cases, and repeats similar operations.

Figure 24:
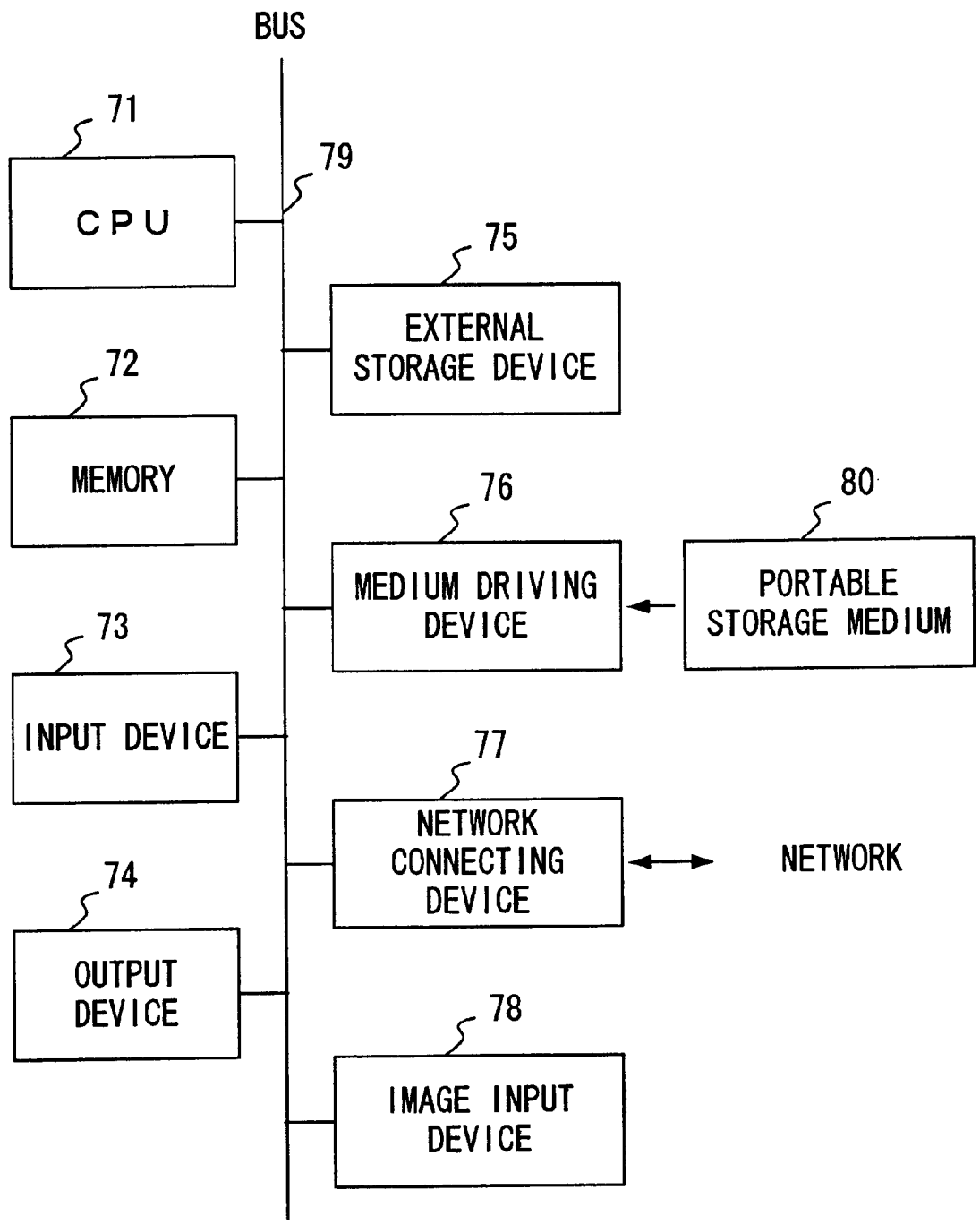
FIG. 24 shows the configuration of an information processing device.

The case accumulating apparatuses shown in FIGS. 2 and 5, and the case accumulating systems shown in FIGS. 10 and 12 are configured, for example, by using an information processing device (computer) shown in FIG. 24. The information processing device shown in FIG. 24 comprises a CPU (Central Processing Unit) 71, a memory 72, an input device 73, an output device 74, an external storage device 75, a medium driving device 76, a network connecting device 77, and an image input device 78, which are interconnected by a bus 79.

The memory 72 includes, for example, a ROM, a RAM, etc., and stores a program and data, which are used for processes. The CPU 71 performs necessary processes by executing the program with the memory 72.

For example, the inquiry generating unit 22, the central controller 23, and the learning unit 24, which are shown in FIG. 2, the data converting unit 31 shown in FIG. 14, the data converting unit 41 shown in FIG. 17, the data converting unit 51 shown in FIG. 20, and the data converting unit 61 shown in FIG. 23 are stored in the memory 72 as software components described by the program.

The input device 73 is, for example, a keyboard, a pointing device, a touch panel, etc., and used to input an instruction or information from a user. The output device 74 is, for example, a display device, a speaker, a printer, etc., and used to output an inquiry to a user or a process result. The input device 73 and the output device 74 correspond to the user interface 21 shown in FIG. 2.

The external storage device 75 is, for example, a magnetic disk device, an optical disk device, a magneto-optical disk device, a tape device, etc. The information processing device stores the above described program and data in the external storage device 75, and uses the program and data by loading them into the memory 72 as occasion demands. The external storage device 75 is used also as the case database 26 shown in FIG. 2.

The medium driving device 76 drives a portable storage medium 80, and accesses its stored contents. As the portable storage medium 80, an arbitrary computer-readable storage medium such as a memory card, a floppy disk, a CD-ROM (Compact Disk-Read Only Memory), an optical disk, a magneto-optical disk, etc. is used. A user stores the above described program and data onto the portable storage medium 80, and uses the program and data by loading them into the memory 72 as occasion demands.

The network connecting device 77 is connected to an arbitrary communications network such as a LAN (Local Area Network), etc., and performs data conversion accompanying a communication. The information processing device receives the above described program and data from a different device such as a server, etc. via the network connecting device 77, and uses the program and data by loading them into the memory 72 as occasion demands.

The image input device 78 is, for example, a scanner, and converts an arbitrary image including a document or a photograph into data that can be processed by the information processing device.

FIG. 25 shows computer-readable storage media that can provide the information processing device shown in FIG. 24 with a program and data. The program and data stored onto the portable storage medium 80 or in a database 82 of a server 81 are loaded into the memory 72. At this time, the server 81 generates a propagation signal propagating the program and data, and transmits the generated signal to the information processing device via an arbitrary transmission medium on a network. The CPU 71 then executes the program by using the data, and performs necessary processes.

According to the present invention, the statistical natures of cases are used only with a relatively easy operation such as preparing a small number of correct answer cases and a large number of cases whose correct answers are unknown, or preparing correct answer cases including errors, whereby correct answer cases can be efficiently accumulated with simple operations.

What is claimed is:

1. A case accumulating apparatus, comprising:
   a storage device storing information about a set of correct answer cases;
   a learning device generating an inference rule while referencing the information stored in said storage device, and inferring a target characteristic from a known characteristic of a case to be inferred in compliance with the inference rule;
   an inquiry device inquiring of a user as to whether or not an inference result of said learning device is correct, and receiving a response from the user; and
   a control device determining the target characteristic of the case to be inferred based on the response, and adding information about the case to be inferred including the determined target characteristic to the set of correct answer cases.

2. The case accumulating apparatus according to claim 1, wherein
   said learning device generates a new inference rule based on the information about the set of correct answer cases, to which the information about the case to be inferred is added, and infers a target characteristic of another case in compliance with the new inference rule.

3. The case accumulating apparatus according to claim 1, further comprising
   a selecting device selecting an inference result of a case to be inquired of the user from among inference results of a plurality of cases to be inferred.

4. The case accumulating apparatus according to claim 1, wherein
   said inquiry device inquires of a plurality of users via a communications network as to whether or not inference results of a plurality of cases to be inferred are correct.

5. A case accumulating apparatus, comprising:
   a storage device storing, for each of a plurality of cases, a known characteristic, a target characteristic, and flag information indicating whether or not an inquiry to a user is necessary;
   a learning device generating an inference rule from a set of cases having flag information indicating that an inquiry is unnecessary while referencing the information stored in said storage device, obtaining a case to be inferred which has flag information indicating that an inquiry is necessary while referencing the information stored in said storage device, and inferring a target characteristic from a known characteristic of the case to be inferred in compliance with the inference rule;
   an inquiry device inquiring of the user as to whether or not an inference result of said learning device is correct, and receiving a response from the user; and
   a control device determining the target characteristic of the case to be inferred based on the response, and changing the flag information of the case to be inferred to flag information indicating that an inquiry is unnecessary.

6. A case accumulating apparatus, comprising:
   a storage device storing information about a set of documents having categories;
   a learning device generating an inference rule while referencing the information stored in said storage device, and inferring a category from a characteristic of a document to be inferred in compliance with the inference rule;
   an inquiry device inquiring of a user as to whether or not an inference result of said learning device is correct, and receiving a response from the user; and
   a control device determining a category of the document to be inferred based on the response, and adding information about the document to be inferred including the determined category to the information about the set of documents.

7. A case accumulating apparatus, comprising:
   a storage device storing information about a set of tagged text data;
   a learning device generating an inference rule while referencing the information stored in said storage device, and inferring a category of a tag from a characteristic of text data to be inferred in compliance with the inference rule;

an inquiry device inquiring of a user as to whether or not an inference result of said learning device is correct, and receiving a response from the user; and a control device determining the category of the tag of the text data to be inferred based on the response, and adding information about the text data to be inferred including the determined category to the set of text data.

8. A case accumulating apparatus, comprising:

a storage device storing information about a set of images;

a learning device generating an inference rule while referencing the information stored in said storage device, and inferring a target characteristic from a known characteristic of an image to be inferred in compliance with the inference rule;

an inquiry device inquiring of a user as to whether or not an inference result of said learning device is correct, and receiving a response from the user; and a control device determining the target characteristic of the image to be inferred based on the response, and adding information about the image to be inferred including the determined target characteristic to the set of images.

9. A computer-readable storage medium on which is recorded a program for causing a computer to execute a process, the process comprising:

generating an inference rule while referencing information about a set of correct answer cases;

inferring a target characteristic from a known characteristic of a case to be inferred in compliance with the inference rule;

inquiring of a user as to whether or not an inference result is correct;

receiving a response from the user;

determining the target characteristic of the case to be inferred based on the response; and adding information about the case to be inferred including the determined target characteristic to the set of correct answer cases.

10. A propagation signal for propagating a program to a computer, the program causing the computer to execute:

generating an inference rule while referencing information about a set of correct answer cases;

inferring a target characteristic from a known characteristic of a case to be inferred in compliance with the inference rule;

inquiring of a user as to whether or not an inference result is correct;

receiving a response from the user;

determining the target characteristic of the case to be inferred based on the response; and adding information about the case to be inferred including the determined target characteristic to the set of correct answer cases.

11. A case accumulating method, comprising:

registering information about a set of correct answer cases to a computer;

generating an inference rule while referencing registered information;

inferring a target characteristic from a known characteristic of a case to be inferred in compliance with the inference rule;

inquiring of a user as to whether or not an inference result is correct;

receiving a response from the user;

determining the target characteristic of the case to be inferred based on the response; and adding information about the case to be inferred including the determined target characteristic to the set of correct answer cases.

12. A case accumulating apparatus, comprising:

storage means for storing information about a set of correct answer cases;

learning means for generating an inference rule while referencing the information stored in said storage means, and for inferring a target characteristic from a known characteristic of a case to be inferred;

inquiry means for inquiring of a user as to whether or not an inference result of said learning means is correct, and for receiving a response from the user; and control means for determining the target characteristic of the case to be inferred based on the response, and for adding information about the case to be inferred including the determined target characteristic to the set of correct answer cases.

* * * * *